United States Patent
Bortz et al.

(10) Patent No.: US 6,922,529 B2
(45) Date of Patent: Jul. 26, 2005

(54) OPTICAL COMMUNICATIONS SYSTEMS, DEVICES, AND METHODS

(75) Inventors: Michael L. Bortz, Columbia, MD (US); William J. Brown, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 10/216,139

(22) Filed: Aug. 9, 2002

(65) Prior Publication Data

US 2004/0028406 A1 Feb. 12, 2004

(51) Int. Cl.[7] .............. G02F 1/00; H04B 10/08; H04J 14/00; H04J 14/08
(52) U.S. Cl. ............... 398/5; 398/12; 398/13; 398/19; 398/20; 398/49; 398/82; 398/85; 398/87
(58) Field of Search .............. 398/2–5, 12, 13, 398/19, 20, 49, 82, 85, 87, 6, 25, 33

(56) References Cited

U.S. PATENT DOCUMENTS

| | | | |
|---|---|---|---|
| 4,039,249 A | 8/1977 | Kaminow et al. | 350/96 |
| 4,725,110 A | 2/1988 | Glenn et al. | 350/3.61 |
| 4,728,165 A | 3/1988 | Powell et al. | 350/364 |
| 4,821,255 A | 4/1989 | Kobrinski | 370/3 |
| 4,989,200 A | 1/1991 | Olshansky et al. | 370/3 |
| 5,007,705 A | 4/1991 | Morey et al. | 350/96.2 |
| 5,101,450 A | 3/1992 | Olshansky | 385/3 |
| 5,121,450 A | 6/1992 | Eichen et al. | 385/22 |
| 5,126,874 A | 6/1992 | Alfano et al. | 359/240 |
| 5,134,509 A | 7/1992 | Olshansky et al. | 359/132 |
| 5,136,670 A | 8/1992 | Shigematsu et al. | 385/42 |
| 5,159,601 A | 10/1992 | Huber | 372/6 |
| 5,181,134 A | 1/1993 | Fatehi et al. | 359/117 |
| 5,191,586 A | 3/1993 | Huber | 372/6 |

(Continued)

FOREIGN PATENT DOCUMENTS

| | | |
|---|---|---|
| EP | 0638837 A1 | 2/1995 |
| EP | 0849968 A2 | 6/1998 |
| EP | 0851545 A2 | 7/1998 |
| EP | 0851705 A2 | 7/1998 |
| JP | PAJ 10051382 A | 2/1998 |
| JP | PAJ 10056661 A | 2/1998 |
| WO | WO 95/13687 A | 5/1995 |
| WO | WO 97/06614 | 2/1997 |

OTHER PUBLICATIONS

International Search Report for PCT/US03/24856.

*Primary Examiner*—M. R. Sedighian

(57) ABSTRACT

Devices, such as node and network elements for use in communications systems, which include a plurality of ports, each having an input and an output, a plurality of splitters corresponding to the port inputs, a plurality of combiners corresponding to the port outputs, a plurality of signal paths between the splitters and the combiners, wherein each of the signal paths includes a signal varying device, and a plurality of protection devices connected between the splitters and the combiners, wherein each of the plurality of protection devices includes a signal varying device and provides a protection path corresponding to a plurality of the signal paths, and wherein at least one splitter has at least one unused output after the signal paths and the protection paths are connected, and wherein at least one combiner has at least one unused input after the signal paths and the protection paths are connected.

22 Claims, 21 Drawing Sheets

U.S. PATENT DOCUMENTS

| | | | | |
|---|---|---|---|---|
| 5,191,626 A | | 3/1993 | Stern | 385/24 |
| 5,194,977 A | * | 3/1993 | Nishio | 398/48 |
| 5,202,786 A | | 4/1993 | Boyle et al. | 359/243 |
| 5,218,651 A | | 6/1993 | Faco et al. | 385/4 |
| 5,268,910 A | | 12/1993 | Huber | 372/6 |
| 5,283,686 A | | 2/1994 | Huber | 359/337 |
| 5,301,058 A | | 4/1994 | Olshansky | 359/188 |
| 5,321,707 A | | 6/1994 | Huber | 372/6 |
| 5,392,154 A | | 2/1995 | Chang et al. | 359/341 |
| 5,400,166 A | | 3/1995 | Huber | 359/173 |
| 5,432,632 A | | 7/1995 | Watanabe | 359/191 |
| 5,446,809 A | | 8/1995 | Fritz et al. | 385/17 |
| 5,452,116 A | | 9/1995 | Kirkby et al. | 359/124 |
| 5,457,556 A | | 10/1995 | Shiragaki | 359/117 |
| 5,457,758 A | | 10/1995 | Snitzer | 385/30 |
| 5,475,780 A | | 12/1995 | Mizrahi | 385/37 |
| 5,479,256 A | | 12/1995 | Tamai et al. | 356/346 |
| 5,528,406 A | | 6/1996 | Jeffrey et al. | 359/128 |
| 5,532,855 A | | 7/1996 | Kato et al. | 359/117 |
| 5,532,864 A | | 7/1996 | Alexander et al. | 359/177 |
| 5,555,118 A | | 9/1996 | Huber | 359/125 |
| 5,570,218 A | | 10/1996 | Sotom | 359/117 |
| 5,579,143 A | | 11/1996 | Huber | 359/130 |
| 5,583,957 A | | 12/1996 | Blow | 385/21 |
| 5,596,436 A | | 1/1997 | Sargis et al. | 359/132 |
| 5,600,473 A | | 2/1997 | Huber | 359/179 |
| 5,608,825 A | | 3/1997 | Ip | 385/24 |
| 5,623,362 A | | 4/1997 | Mitsuda et al. | 359/341 |
| 5,627,925 A | | 5/1997 | Alferness et al. | 385/17 |
| 5,633,961 A | | 5/1997 | Kirkby et al. | 385/16 |
| 5,633,965 A | | 5/1997 | Bricheno et al. | 385/37 |
| 5,636,304 A | | 6/1997 | Mizrahi et al. | 385/37 |
| 5,652,814 A | | 7/1997 | Pan et al. | 385/24 |
| 5,706,375 A | | 1/1998 | Mihailov | 385/24 |
| 5,712,932 A | | 1/1998 | Alexander et al. | 385/24 |
| 5,726,785 A | | 3/1998 | Chawki et al. | 359/130 |
| 5,742,416 A | | 4/1998 | Mizrahi | 359/134 |
| 5,754,320 A | | 5/1998 | Watanabe et al. | 359/117 |
| 5,771,112 A | | 6/1998 | Hamel et al. | 359/128 |
| 5,778,118 A | | 7/1998 | Sridhar | 385/24 |
| 5,815,613 A | | 9/1998 | Fatehi et al. | 385/22 |
| 5,889,600 A | * | 3/1999 | McGuire | 398/50 |
| 5,933,552 A | | 8/1999 | Fukushima et al. | 385/24 |
| 5,940,551 A | | 8/1999 | Oberg | 385/17 |
| 5,946,430 A | | 8/1999 | Morrow et al. | 385/24 |
| 5,953,467 A | | 9/1999 | Madsen | 385/15 |
| 5,991,476 A | | 11/1999 | Baney | 385/16 |
| 6,049,418 A | | 4/2000 | Srivastava et al. | 359/341 |
| 6,097,859 A | | 8/2000 | Solgaard et al. | 385/17 |
| 6,137,604 A | | 10/2000 | Bergano | 359/124 |
| 6,259,555 B1 | * | 7/2001 | Meli et al. | 359/337 |
| 6,289,145 B1 | | 9/2001 | Solgaard et al. | 385/17 |
| 6,307,654 B2 | * | 10/2001 | Frigo | 398/83 |
| 6,404,525 B1 | * | 6/2002 | Shimomura et al. | 398/82 |
| 6,433,902 B1 | * | 8/2002 | Chiaroni et al. | 398/45 |
| 6,483,958 B2 | * | 11/2002 | Bandemer et al. | 385/11 |
| 2003/0170025 A1 | * | 9/2003 | Bortolini et al. | 398/50 |

* cited by examiner

OPTICAL COMMUNICATIONS SYSTEMS, DEVICES, AND METHODS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention is directed generally to optical communications systems, devices, and methods. More particularly, the invention relates to systems, devices, and methods for processing signals in optical communications systems, and the design and upgrade of nodes and network elements in optical communications systems.

Optical communications systems are typically formed from nodes and network elements connected by optical communications paths, such as optical fiber. The nodes and network elements perform functions such as adding, dropping, switching, and amplifying optical signals so that they reach their intended destination in the network.

There are several different types network architectures in use today, including point to point networks, all-optical networks, ring networks, mesh networks, and others. In addition, there are different protection schemes in use to protect traffic from failures in the network. However, as traffic volumes increase and more services are offered, older networks can no longer efficiently carry traffic and do not offer the flexibility needed in a modern communications system. Unfortunately, upgrading such networks often requires that traffic across the network be interrupted, which is costly to network operators and inconvenient to customers. Some solutions have been proposed to provide for more flexibility in optical networks, such as U.S. Pat. No. 5,557,439, but those solutions are often inadequate for modern optical communications systems.

In view of these difficulties, there is a clear need for improved networks, network nodes and elements, and methods, that provide for better network flexibility.

BRIEF SUMMARY OF THE INVENTION

The systems, devices, and methods of the present invention address the above-stated need for more flexible optical communications systems, devices, and methods. In one embodiment, the present invention includes devices, such as node and network elements for use in communications systems, which include a plurality of ports, each having an input and an output, a plurality of splitters corresponding to the port inputs, a plurality of combiners corresponding to the port outputs, a plurality of signal paths between the splitters and the combiners, wherein each of the signal paths includes a signal varying device, and a plurality of protection devices connected between the splitters and the combiners, wherein each of the plurality of protection devices includes a signal varying device and provides a protection path corresponding to a plurality of the signal paths, and wherein at least one splitter has at least one unused output after the signal paths and the protection paths are connected, and wherein at least one combiner has at least one unused input after the signal paths and the protection paths are connected.

In another embodiment, the present invention may be an all-optical device for use in a communications system, including a plurality of ports, each having an input and an output, a plurality of splitters corresponding to the port inputs, wherein the splitters include a first stage and a second stage, a plurality of combiners corresponding to the port outputs, wherein the combiners include a first stage and a second stage, a plurality of signal paths between the splitters and the combiners, wherein each of the signal paths includes a signal varying device, a plurality of protection devices connected between the splitters and the combiners, wherein each of the plurality of protection devices provides a protection path for a plurality of the signal paths, a plurality of optical receivers connected to outputs of the first stage splitters, and a plurality of optical transmitters connected to inputs of the second stage combiners.

The present invention may be implemented as an all-optical device, thereby allowing partial or total all-optical networking and its associated benefits. For example, the present invention may be implemented as an all-optical network including one or more nodes or network elements of the present invention. In other embodiments, advantages of the present invention may be realized in architectures and designs which are not all-optical. The present invention also includes methods and systems incorporating the present invention, as well as other embodiments and variations of the present invention, as will be taught and described herein.

Those and other embodiments of the present invention will be described in the following detailed description. The present invention addresses the needs described above in the description of the background of the invention by providing improved systems, devices, and methods. These advantages and others will become apparent from the following detailed description.

BRIEF DESCRIPTION OF THE SEVERAL VIEWS OF THE DRAWING

Embodiments of the present invention will now be described, by way of example only, with reference to the accompanying drawings, wherein.

DETAILED DESCRIPTION OF THE INVENTION

Figure 1:
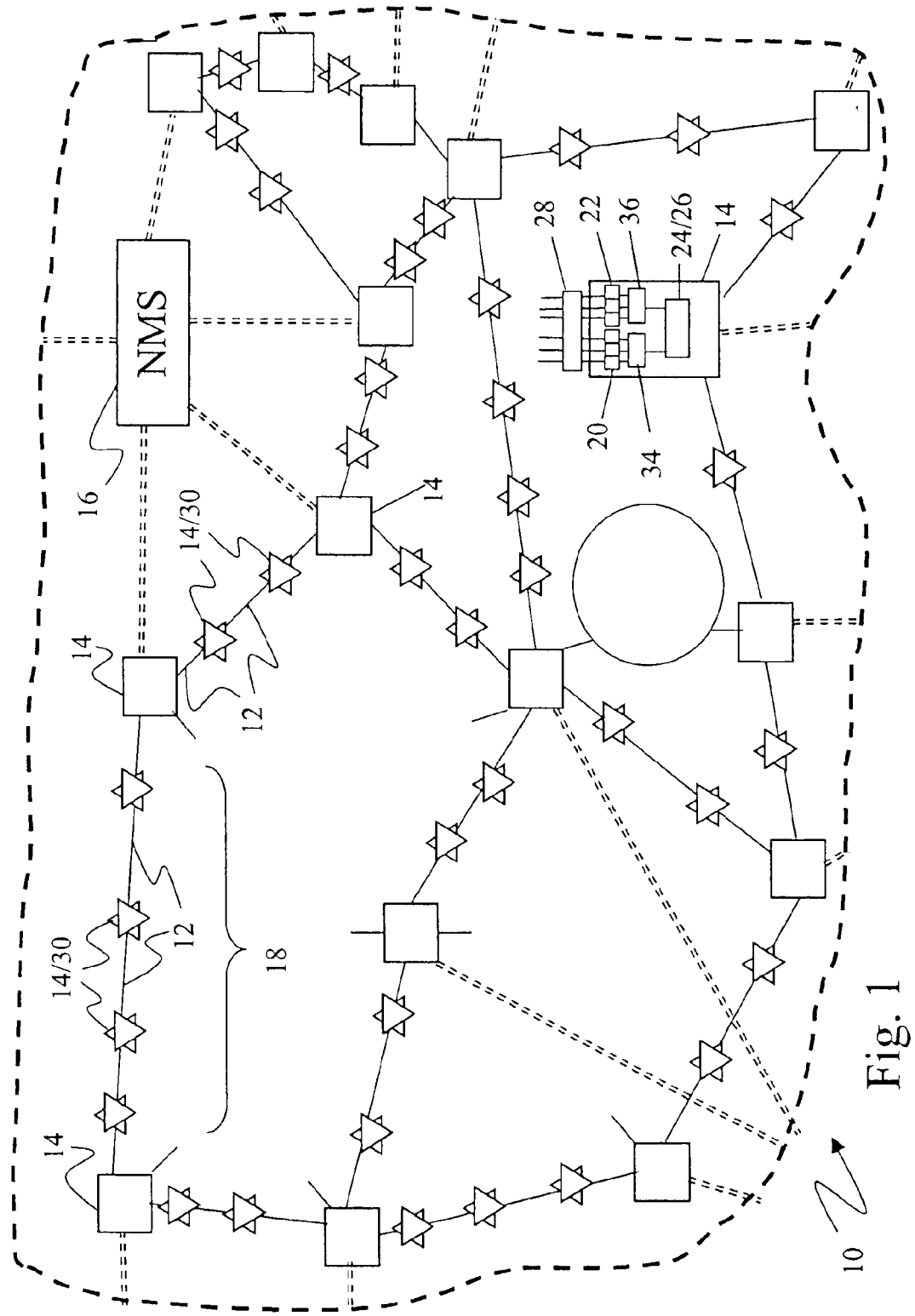
FIGS. 1 and 2 illustrate examples optical communications systems.

FIG. 1 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted fiber ("DSF"), non-dispersion shifted fiber ("NDSF"), non-zero dispersion shifted fiber ("NZDSF"), dispersion compensating fiber ("DCF"), polarization maintaining fiber ("PMF"), single mode fiber ("SMF"), multimode fiber ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signals, each including one or more channels or wavelengths. The optical signal channels can be treated individually or as a single group, or they can be organized into two or more wavebands or spectral groups, each containing one or more optical signal channel. The optical signal channels within a spectral group are all treated the same. For example, all optical signal channels in a spectral group are switched in the same manner, and all are dropped at the same locations, even if every optical signal channel in the spectral group is not utilized at every location at which it is dropped. The use of spectral groups to treat groups of channels in the same manner is one way to efficiently manage large numbers of optical signal channels. One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes 14 can perform network functions or processes, such as switching, routing, amplifying, multiplexing, combining, demultiplexing, distributing, or otherwise processing optical signals. For example, nodes 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 1, although the nodes 14 can have many other variations and embodiments. Additional examples of nodes 14 are described in U.S. patent application Ser. No. 10/032, 051, filed Dec. 21, 2001,which is incorporated herein by reference.

The NMS 16 can manage, configure, and control nodes 14 and can include multiple management layers that can be directly and indirectly connected to the nodes 14. The NMS 16 can be directly connected to some nodes 14 via a data communication network (shown in broken lines) and indirectly connected to other nodes 14 via a combination of a directly connected node and communications paths in the optical system 10. The data communication network can, for example, be a dedicated network, a shared network, or a combination thereof. A data communications network utilizing a shared network can include, for example, dial-up connections to the nodes 14 through a public telephone system. The NMS 16 can reside at one or more centralized locations and/or can be distributed among components in the system 10. Mixed data or supervisory channels can be used to provide connections between the network elements of the NMS 16, which can be located in nodes 14 or remote from nodes 14. The supervisory channels can be transmitted within and/or outside the signal wavelength band and on the same medium or a different medium than the wavelength band. Examples of an NMS 16 are described in U.S. patent application Ser. No. 60/177,625, filed Jan. 24, 2000, and PCT Patent Application PCT/US01/02320, filed Jan. 24, 2001, both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides an optical carrier and can utilize, for example, coherent or incoherent sources, and narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-dispersion and distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, WDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. No. 10/090,015, filed Feb. 22, 2002, which is incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and a interfacial switch 24 portion, such that some signals are switched without an O-E-O conversion, while other signals are subjected to an O-E-O conversion.

Switches 24 can have many forms and variations. For example, in addition to being integrated or dedicated, and having an optical and/or electrical switch fabric, a switch 24 can be polarization-sensitive or polarization-insensitive. As discussed hereinbelow in more detail, the present invention can produce a pair of optical signals which have orthogonal polarization and which occupy the same optical frequency range. A switch 24 which is polarization sensitive can switch those signals separately, possible sending them to different destinations. A polarization-insensitive switch 24 can also be used with such signals, but the pair of signals will be switched together such that both are switched to the same destination. For example, an integrated, polarization-insensitive switch 24 might filter the optical frequency range containing the orthogonally polarized pair of signals, and switch that filtered signal using an optical switch fabric, without regard to whether it contains a single signal or a pair of orthogonally polarized signals.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers. Two or more amplifiers 30 may be co-located and concatenated to provide additional flexibility.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths $\lambda_1$ in the optical systems 10.

Figure 2:
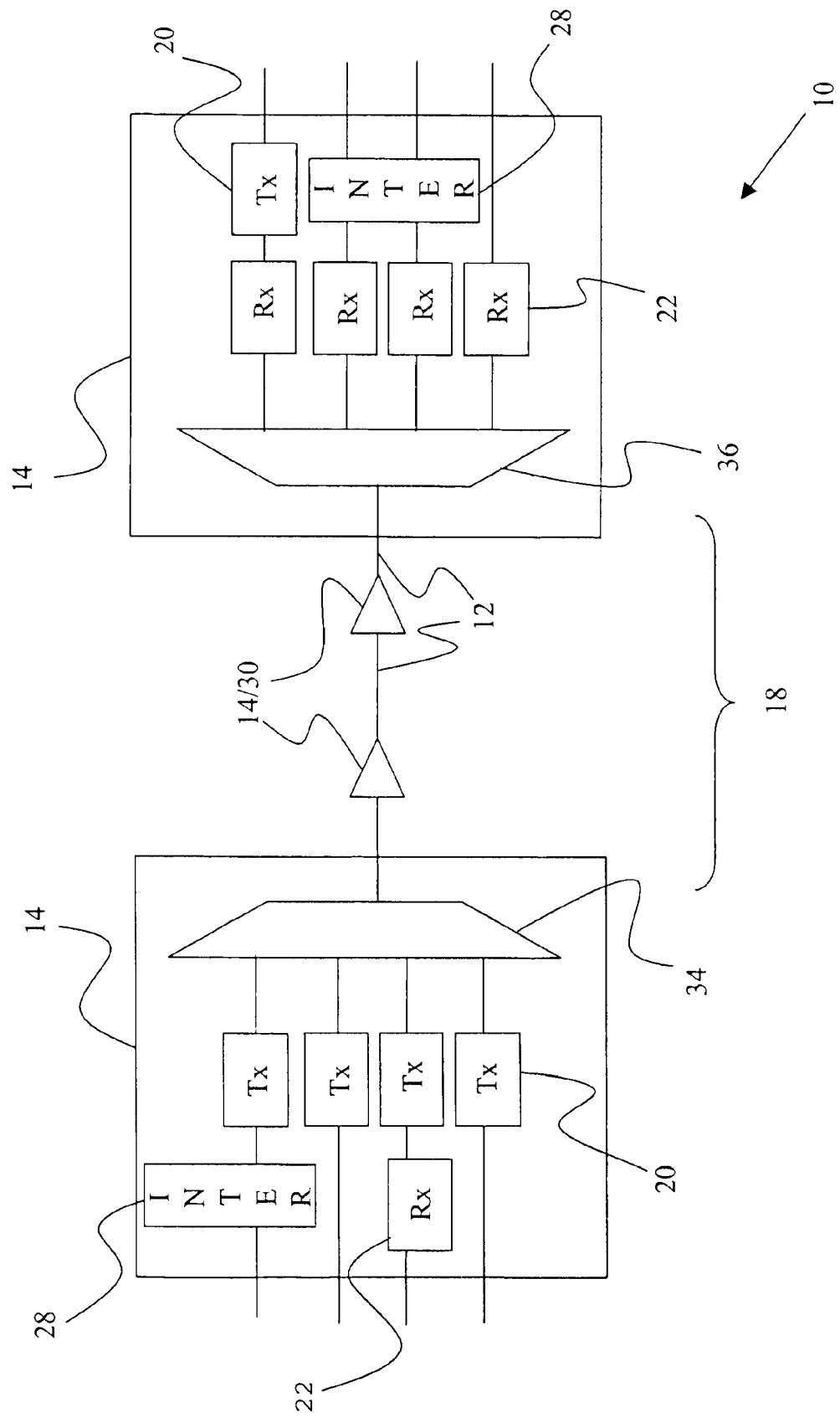

FIG. 2 illustrates another embodiment of the system 10 including a link 18 of four nodes and network elements 14. That system 10 can, for example, be all or part of a point to point system 10, or it may be part of a multi-dimensional, mesh, or other system 10. One or more of the nodes or network elements 14 can be connected directly to the network management system 16 (not shown). If the system 10 is part of a larger system, then as few as none of the nodes or network elements 14 can be connected to the network management system 16 and all of the nodes and network elements 14 can still be indirectly connected to the NMS 16 via another node or network element 14 in the larger system 10.

Figure 3:
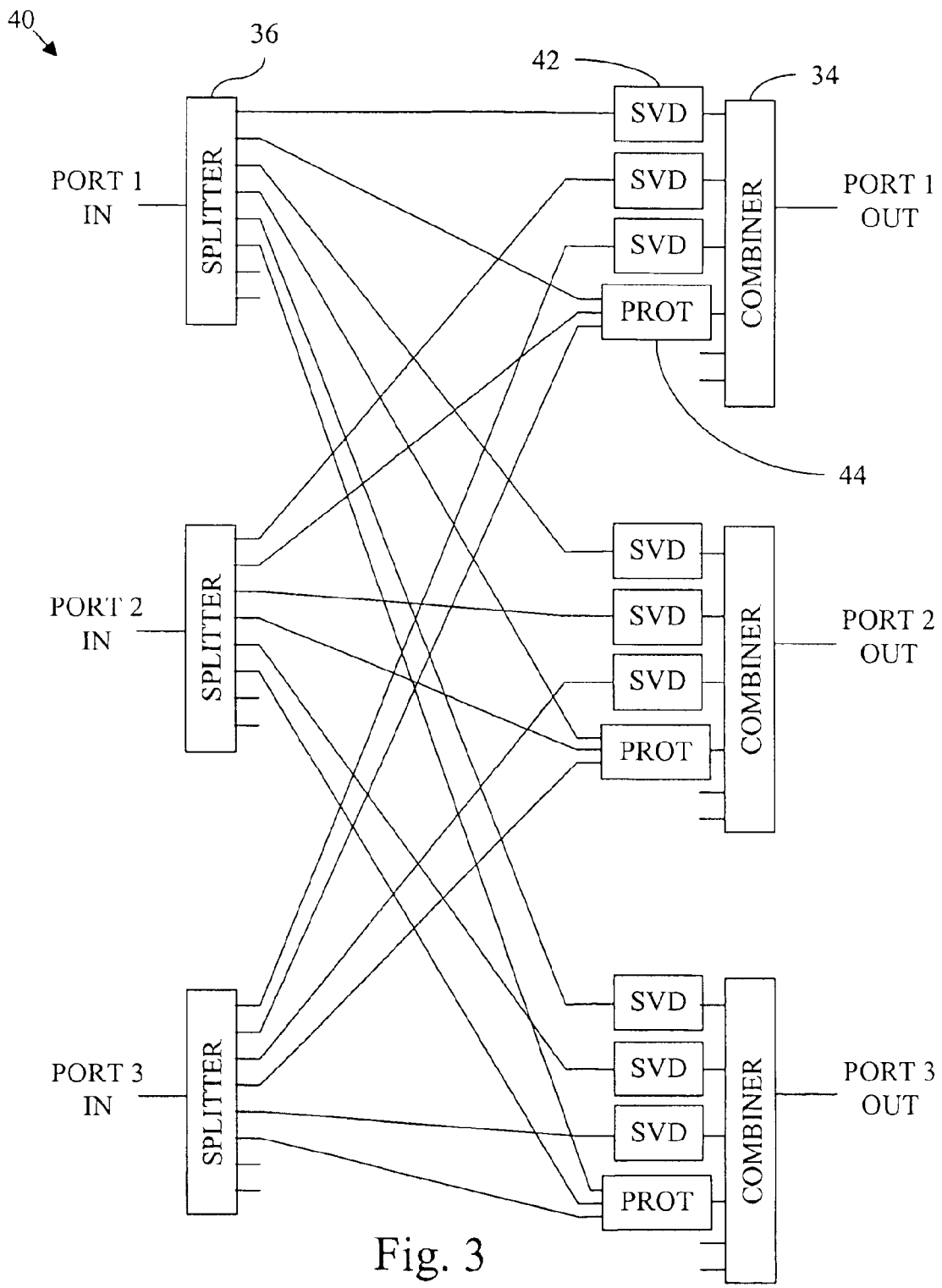
FIGS. 3–6 illustrate examples of devices.

FIG. 3 illustrates one embodiment of a device 40 according to the present invention, which may be used, for example, in a node or network element 14 of a communications system 10. The device 40 is a three port switch including splitters 36, signal varying devices 42, protection devices 44, and combiners 34. The device 40 is all-optical, so that optical signals enter the device 40, are switched, and leave the device 40 without undergoing an O-E-O conversion. In other embodiments, advantages of the present invention may be realized with O-E-O conversions.

The splitters 36 split optical signals entering each port and provide split signals to several outputs of the splitters 36. The splitters 36 may have more or less outputs than those shown herein, depending on the application. Furthermore, the splitters 36 within a device 40 may all have the same number of outputs, or they may have different numbers of outputs. The splitters 36 may have one or more stages, such as by cascading smaller splitters to form a larger splitter. Multiple stages may also be used to provide split signals having different signal powers. One or more amplifiers may also be used, either in a splitter or near a splitter, to increase the signal power of the split signals. Amplifiers may also be used in other parts of the device 40, as needed.

The combiners 34 combine signals from the signal varying devices 42 and the protection devices 44. Like the splitters 36, the combiners 34 may have many variations, including multiple stages and different numbers of inputs. The combiners 34 may also include one or more amplifiers.

The signal varying devices 42 are connected between the splitters 36 and the combiners 34 and form signal paths therebetween. The signal varying devices 42 may be, for example, relatively simple devices that either pass all of the signal channels or block all of the signal channels. Alternatively, the signal varying devices 42 may be more sophisticated, such as by having the ability to selectively block some signal channels and pass other signal channels. For example, signal varying devices 42 may be used to selectively block signal channels being dropped at the node so as to allow for channel reuse, or to selectively block signal channels from being sent to ports where they are not desired. The signal varying devices 42 may operate on signal channels in groups of two or more, the signal varying devices may operate on individual signal channels, or the signal varying devices may operate both on individual signal channels and signal channels in groups of two or more. The signal varying devices 42 may also perform other functions, such as selectively amplifying, attenuating, filtering, or performing other signal grooming or varying functions, such as dispersion compensation (e.g., chromatic and polarization mode). The signal varying devices 42 may be static or dynamic. In that later case, one or more characteristics, such as channel plans or other operational features, may be changed, such as by the NMS 16 or by other controllers.

The protection devices 44 provide a protection path for signals. In FIG. 3 there is one protection path shared by three signal paths. More or less protection, or no protection at all, may also be provided. The protection devices 44 provide an alternate path for signals in the event of a problem in the normal signal path within the device 40. The protection devices 44 may also perform various signal varying and grooming functions, such as those described with respect to the signal varying devices 42. The protection devices 44 and their architecture will be described in the context of the upgradable device, although aspects of the protection devices 44 and architecture may also be utilized in devices and systems which are not upgradable. Similarly, the upgradable devices and systems may be used without the particular protection devices and architecture described herein.

The device 40 may be controlled by a local controller, a remote controller, or a combination of local and remote controllers. For example, the NMS 16 or another remote controller may monitor signals in the system 10 and, if a failure is detected within a device 40, instruct that device 40 to utilize the appropriate protection device 44. Alternatively, a local controller in the device 40 may monitor signals and instruct the device 40 to utilize the appropriate protection device 44. Signal monitoring may be performed at many locations within a system 10 utilizing, for example, optical taps and photodetectors. Feedback and control will be discussed in more detail hereinbelow with respect to FIG. 7. Typically, switching to a protection path is performed automatically when certain conditions are detected, although it may also be performed manually. Switching back from the protection path may be performed automatically or it may require manual intervention, such as to ensure that any faults have been corrected.

Figure 4:
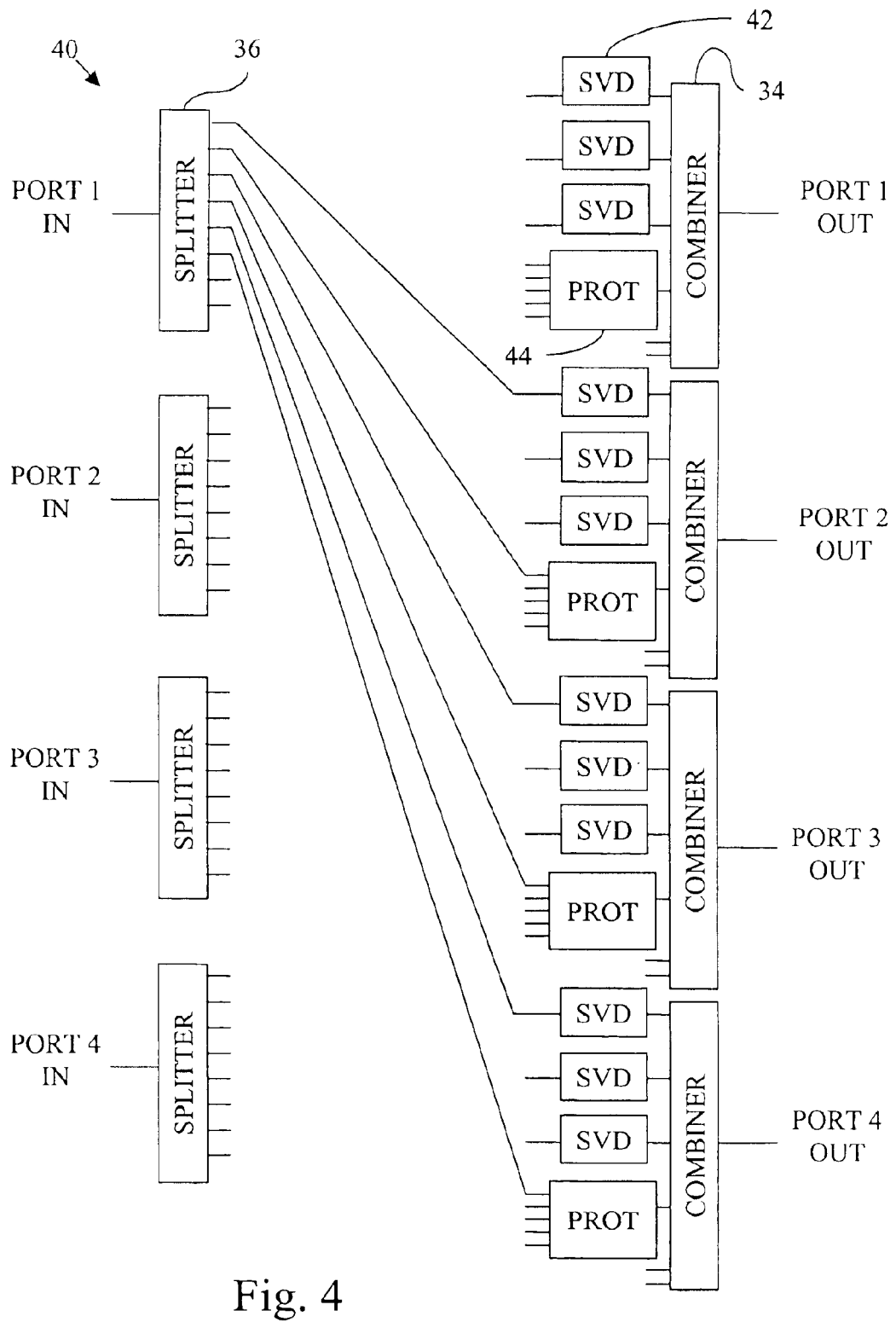
Figure 5:
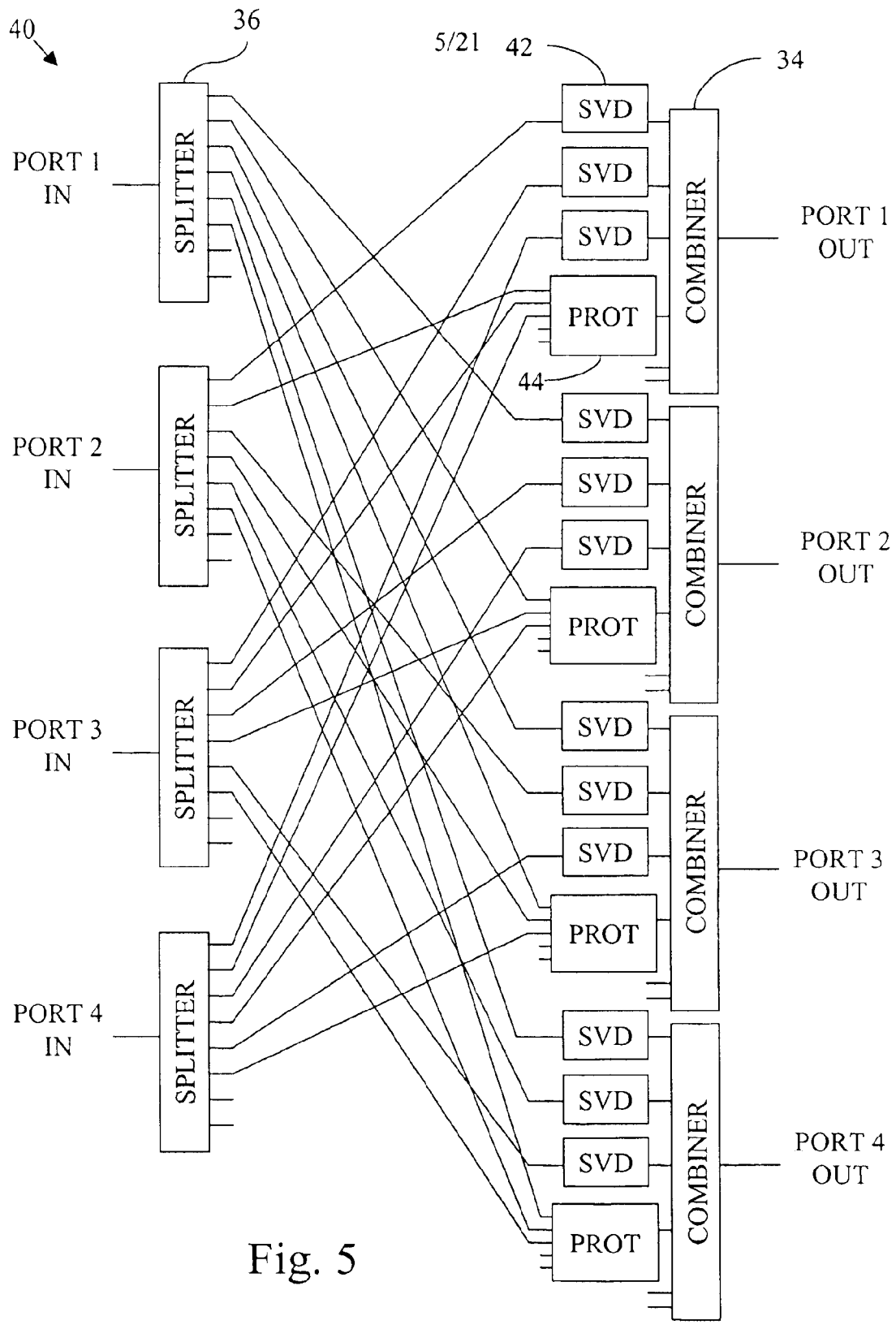

FIGS. 4 and 5 illustrate another embodiment of a device 40 in the form of an all-optical four port switch 24. For clarity, only connections from PORT 1 IN are shown in FIG. 4. Connections between all of the ports are shown in FIG. 5. In that embodiment, loop back functionality is not provided, thereby simplifying the design by reducing the number of connections. In other words, signals entering a port (e.g., PORT 1) cannot exit the same port (e.g., PORT 1). As a result, there is at least one less connection to make for each port. In other embodiments of the present invention, such as FIG. 3, loop back functionality may be provided.

Figure 6:
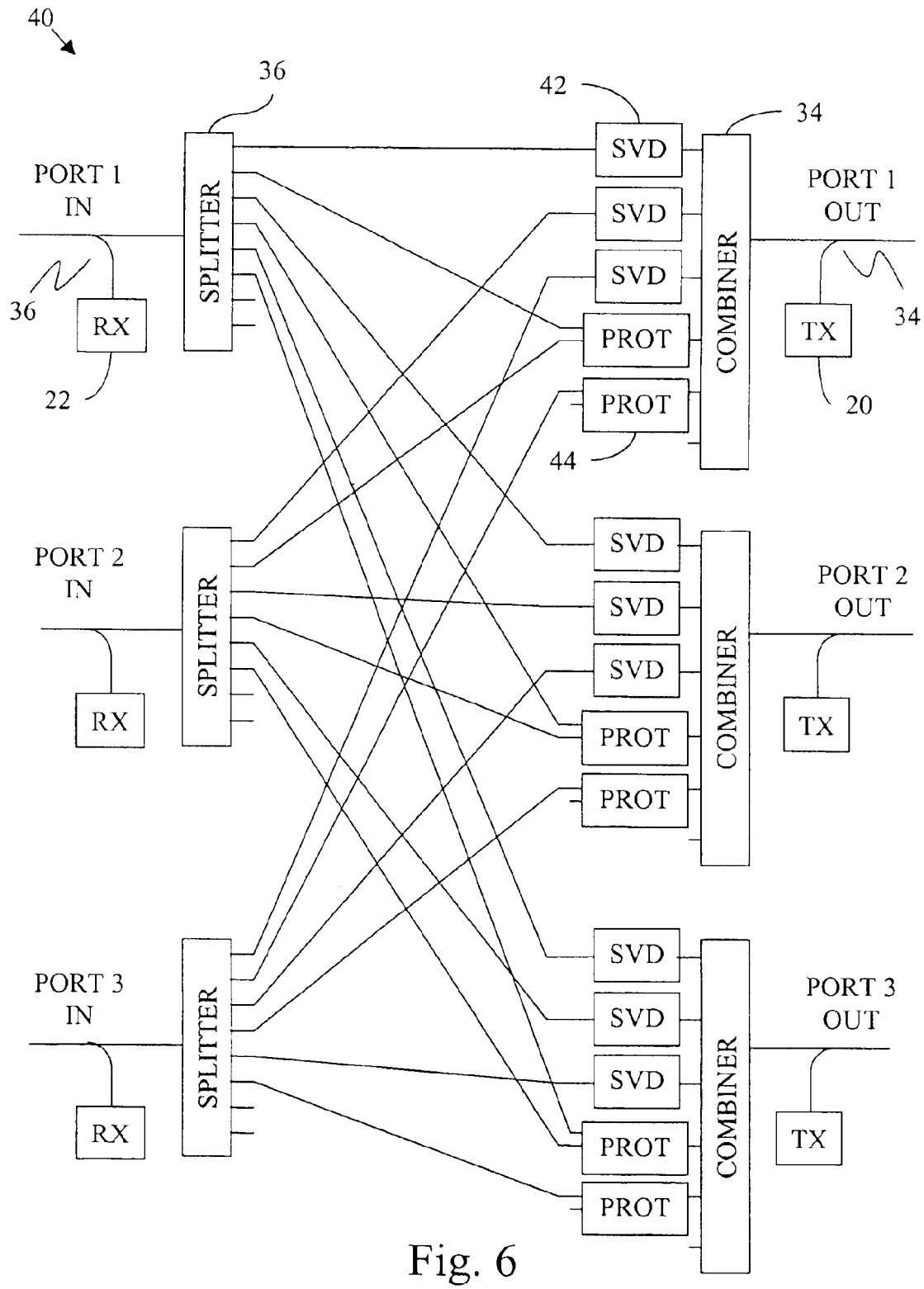

FIG. 6 illustrates another embodiment of an all-optical device 40 including receivers 22 and transmitters 20, which can be used to drop and add traffic. In that embodiment, each port has both a receiver 22 and a transmitter 20, thereby allowing signal channels entering any port to be "dropped", and allowing signal channels to be "added" at any port. Alternatively, transmitters 20 and receivers 22 may be present at less than all of the ports, thereby providing for more limited adding and dropping of signal channels. The illustrated embodiment utilizes two stage splitters 36 and combiners 34, with one stage providing a connection for the receivers 22 and transmitters 22, and the other stage providing connections to signal varying devices 42 and protection devices 44. In other embodiments, the transmitters 20 and receivers 22 may be connected to the same splitters 36 and combiners 34 as the signal varying devices 42 and protection devices 44. More or less stages may also be used in the splitters 36 and combiners 34.

FIG. 6 also illustrates an embodiment in which more than one protection device 44 is used for each port. In that embodiment, two protection devices 44 are used at each port. More or less protection devices 44 may also be used with the present invention. Furthermore, each signal may be connected to more than one protection device 44 at each port, such as to provide multiple protection paths to each output port.

Figure 7:
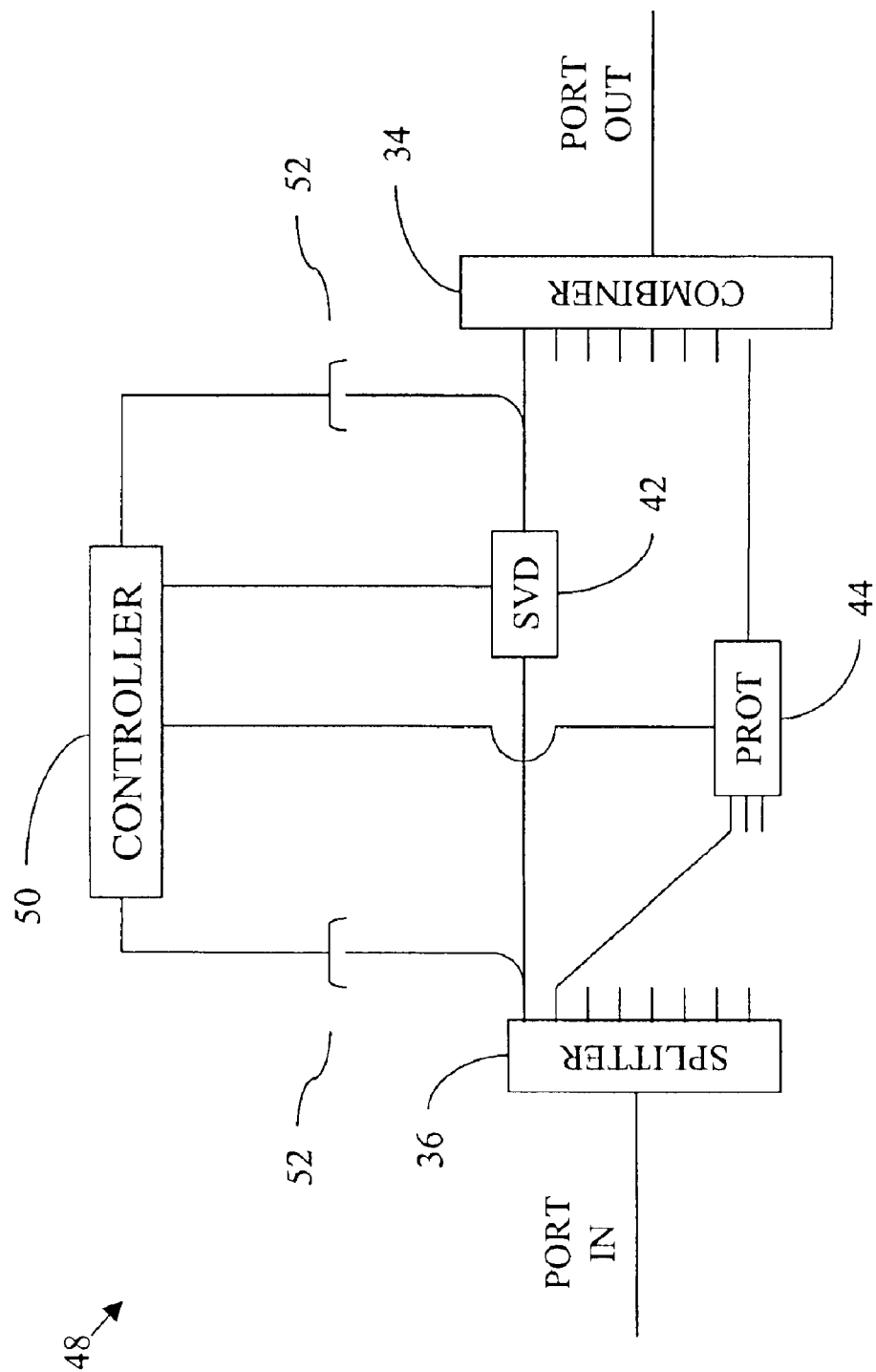
FIG. 7 illustrates an example of a feedback and control system.

FIG. 7 illustrates one embodiment of a portion of a feedback and control system 48 that may be used with the present invention. For clarity, FIG. 7 only illustrates one port, one signal path, and one protection path, although the teachings of the present invention are applicable to device 40 including more ports, signal paths, and protection paths. The system 48 includes a controller 50 receiving feedback from photodetectors 52 and providing control signals to the signal varying device 42 and protection device 44. The number and location of controllers 50 and photodetectors 52 may vary in other embodiments. The controller 50 may be local or remote, such as in the device 40, in the node or network element 14, in the network management system 16, or in other places in the system 10. One or more photodetectors 52 may be located in or between devices 40 to detect the presence or absence, power level, or other characteristics of signals. Photodetector 52 may be located after the signal varying device 42 to detect a failure of the signal varying device 42. A photodetector 52 may also be located before the signal varying device 42, such as to provide a reference for comparison with the signal detected after the signal varying device 42. Feedback from one or more photodetectors 52 may be used by the controller 50 to provide control signals to the signal varying devices 42 and protection devices 44. For example, feedback from the photodetectors 52 may be used by the controller 50 to send control signals to the signal varying devices 42 for purposes of signal grooming. Likewise, if the signal is not detected, or if one or more characteristics of the signal is not acceptable, the controller 50 may send a control signal to the signal varying device 42 instructing it to block the signal, and send a control signal to the protection device 44 instructing it to provide the signal via the protection path. The photodetectors 52 may be, for example, photodiodes or other detectors, such as optical spectrum analyzers, dispersion monitors, SONET testers, or other devices which can detect and provide information to the controller 50.

Figure 8:
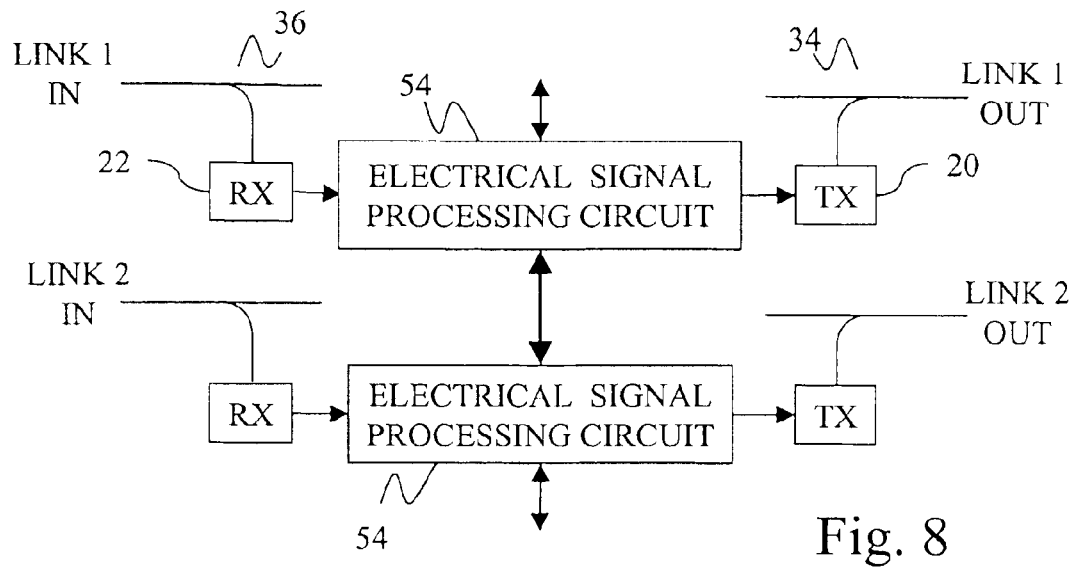
FIGS. 8–14 illustrate examples of upgrading devices.
Figure 9:
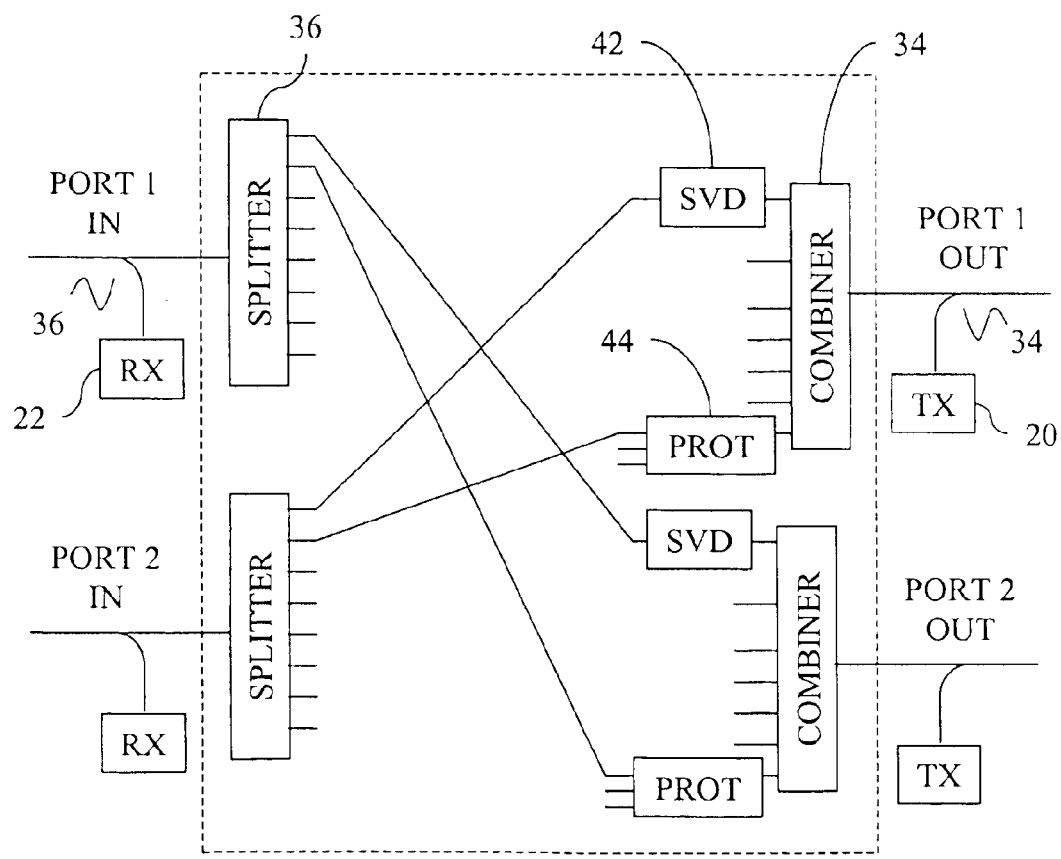

FIGS. 8 and 9 illustrate one example in which a device 40 can be upgraded or modified according to the present invention. In the example illustrated in FIGS. 8 and 9, an O-E-O device 40, such as may form part of a node 14 between two point to point links, is upgraded to an all-optical device 40 or node 14.

FIG. 8 illustrates the node 14 prior to the upgrade. Signals passing through the node 14 are received by the receiver 22 and converted into electrical signals and processed by electrical circuits 54, regardless of whether they are to be dropped at the node 14 or continue through the next link. As a result, signals which continue through to the next link must be retransmitted by the transmitter 20, thereby undergoing an O-E-O conversion whenever they pass through the node 14. Under some circumstances, such a node 14 may be desirable. However, in many circumstances, such as with increased signal traffic, all-optical nodes 14 are more efficient.

FIG. 9 illustrates one upgrade embodiment according to the present invention. The upgrade portion of the node 14 is within broken line box and is connected to the splitters 36 and combiners 34 near the transmitters 20 and receivers 22 to form an all-optical node 14. In the upgraded node, link 1 is connected to port 1, and link 2 is connected to port 2. The node 14 allows for all-optical bypass of signals from port 1 to port 2, and vice versa, while also allowing signals to be added and dropped at the node 14. This upgrade may be accomplished without interrupting traffic through the node 14. The electrical circuits 54 are not shown in FIG. 9, although they may still be used, such as for signal processing of dropped and added signals and for monitoring and providing feedback on signals passing through the node 14.

Figure 10:
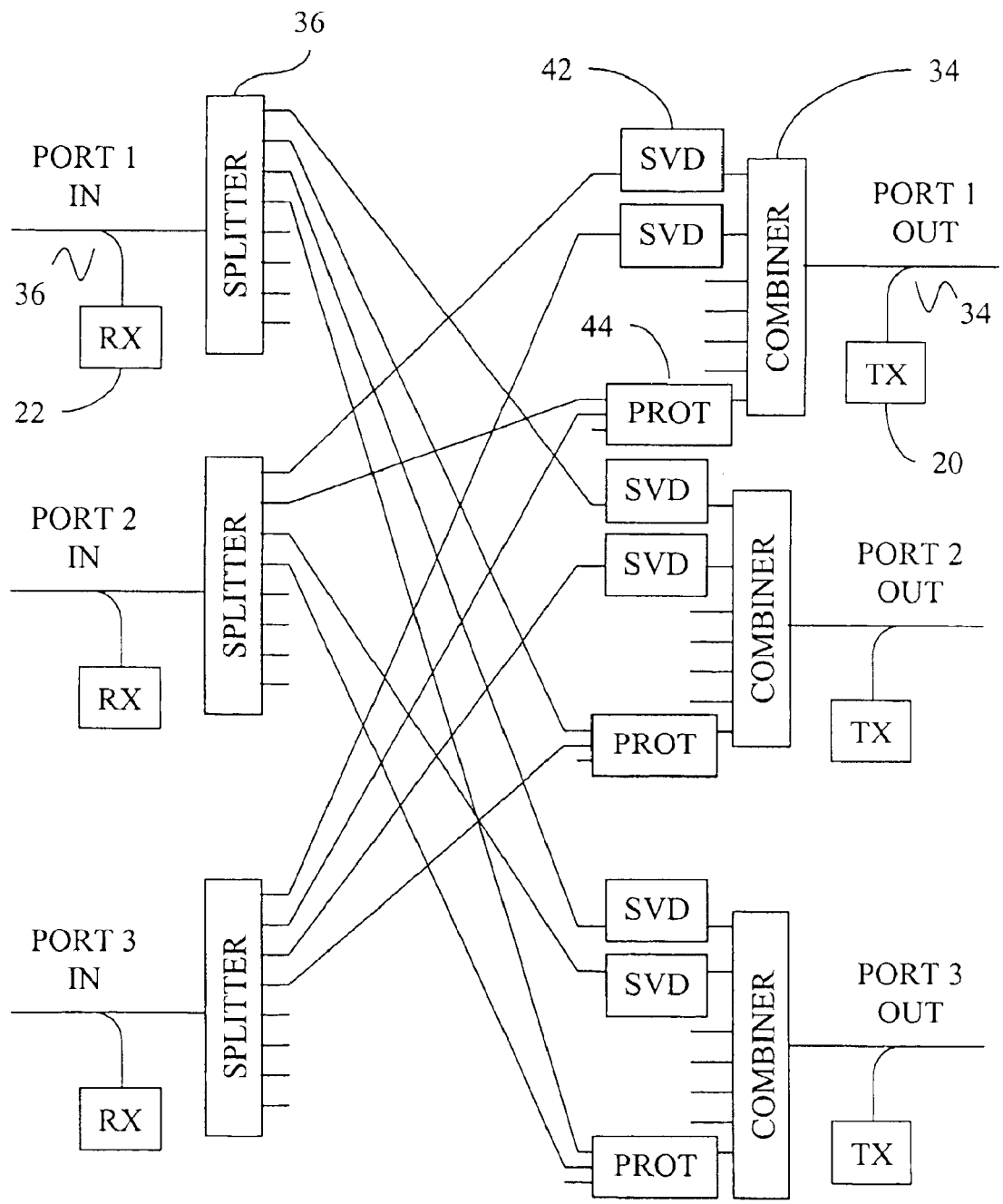

FIG. 10 illustrates a further upgrade embodiment in which a third port is added to the node 14 illustrated in FIG. 9. A splitter, signal varying devices, a protection device, and a combiner are added and interconnected with the existing node 14. As in the previous example, this upgrade may be performed without interrupting existing traffic. Additional upgrades, such as to add additional ports, may be implemented without interrupting the signal traffic through the node 14 by utilizing unused terminals on the splitters 36, combiners 36, and protection devices 44.

Figure 11:
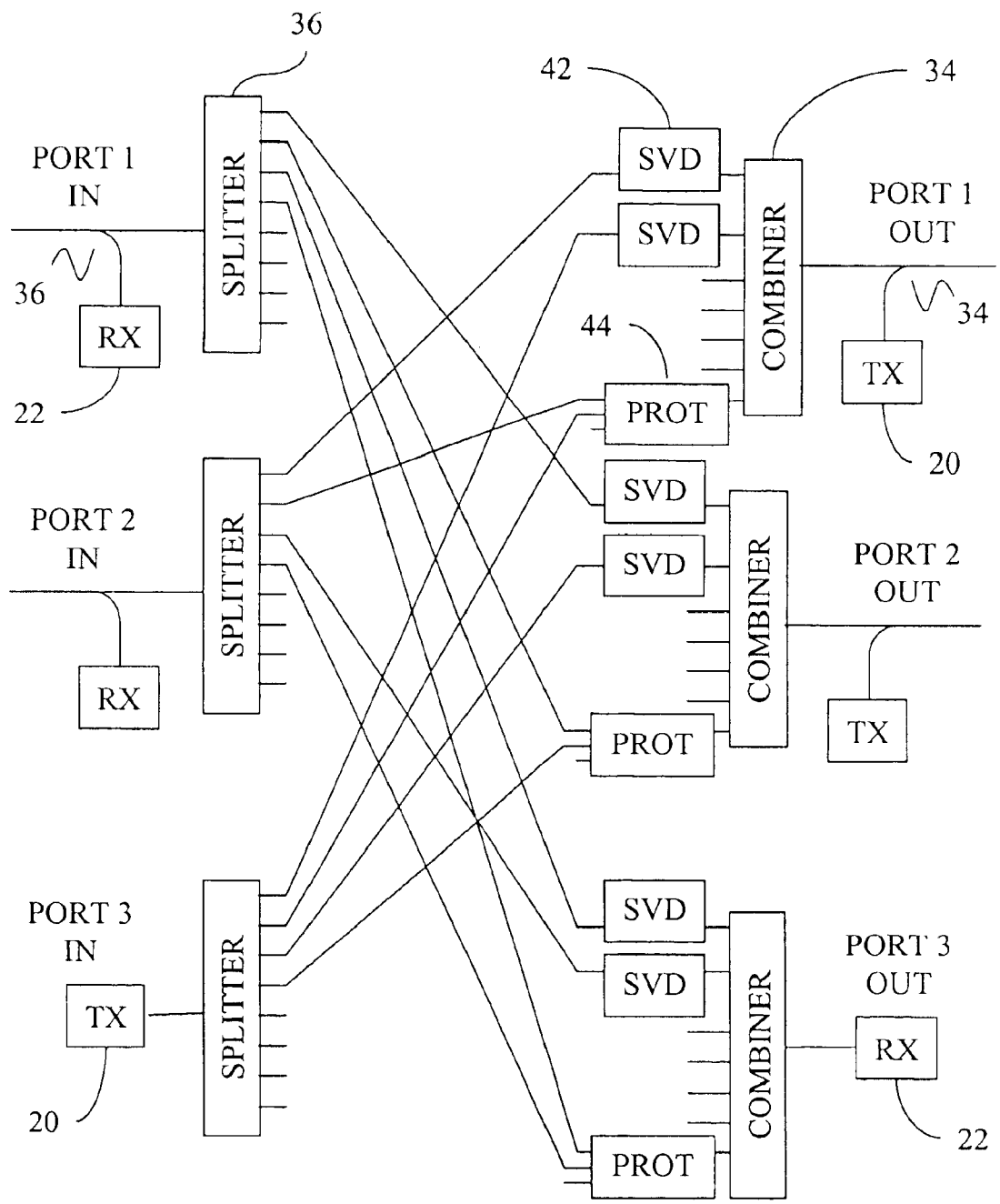

FIG. 11 illustrates an embodiment of a device 40 providing dynamic switching, wherein a transmitter 20 is connected to PORT 3 IN, and the signals from the transmitter 20 can be switched to one or more of the output ports. Similarly, a receiver 22 is connected to PORT 3 OUT, and it can be connected to receive signals from one of the input ports. In FIG. 11, dynamic switching is perform through PORT 3, although it may also be performed through more or different ports. Also, some ports may have a transmitter 20 but not a receiver 22, or vice versa, or ports may be shared by more than one transmitter 20 or receiver 22 or with other data streams.

Figure 12:
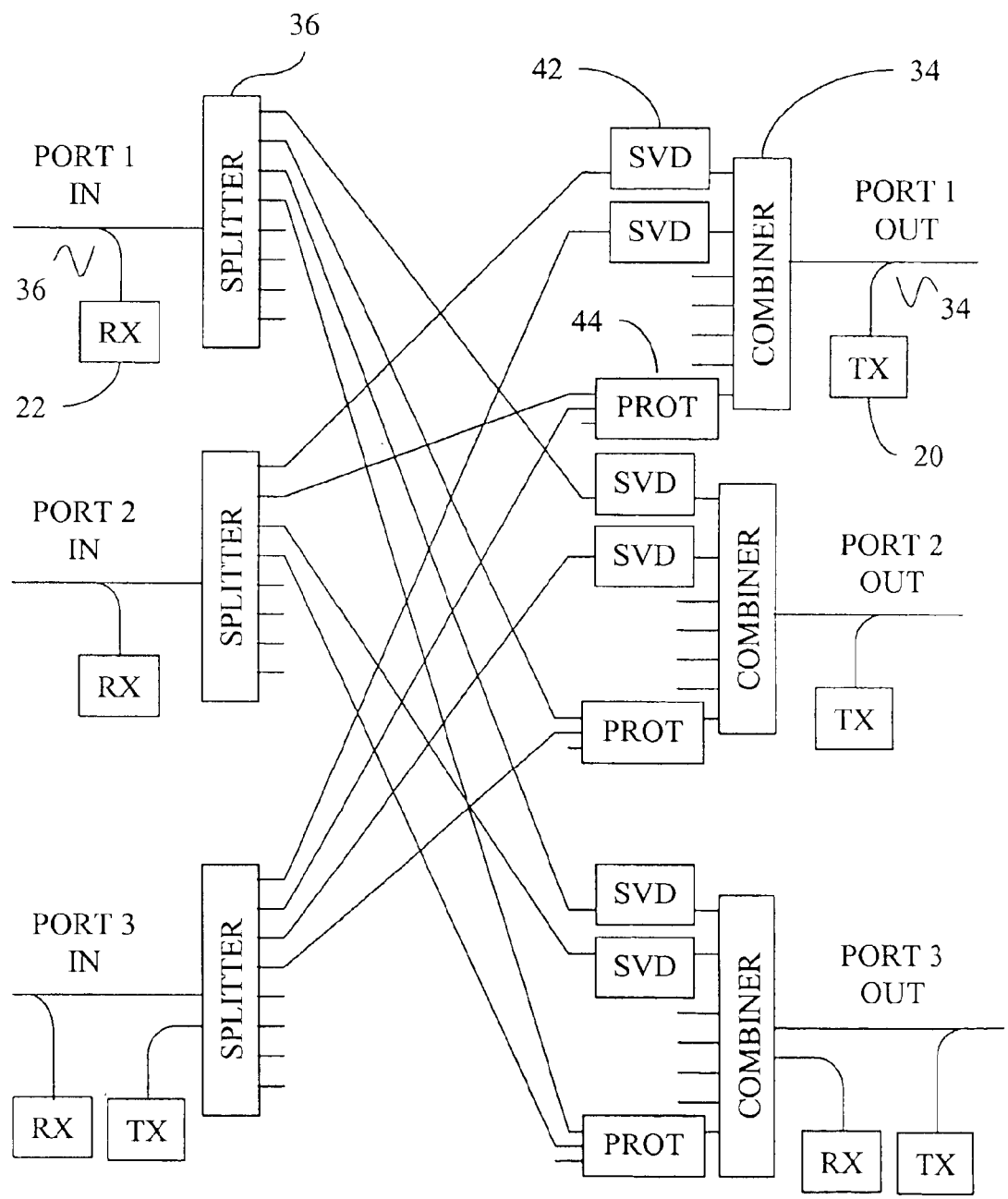

FIG. 12 illustrates an embodiment of a device 40 in which a splitter 36 at PORT 3 IN has more than one input, and a coupler 34 at PORT 3 OUT has more than one output, such as to facilitate the processing of multiple signal streams at the port. For example, at the splitter 36 one input may receive traffic and one input may receive test signals. In another example, one input at the splitter 36 may receive traffic from a remote transmitter 20, and one input may be connected to a local transmitter. Other variations are also possible. Similarly, multiple outputs at the combiner 34 may be used, for example, to facilitate monitoring of signals or for other purposes.

Figure 13:
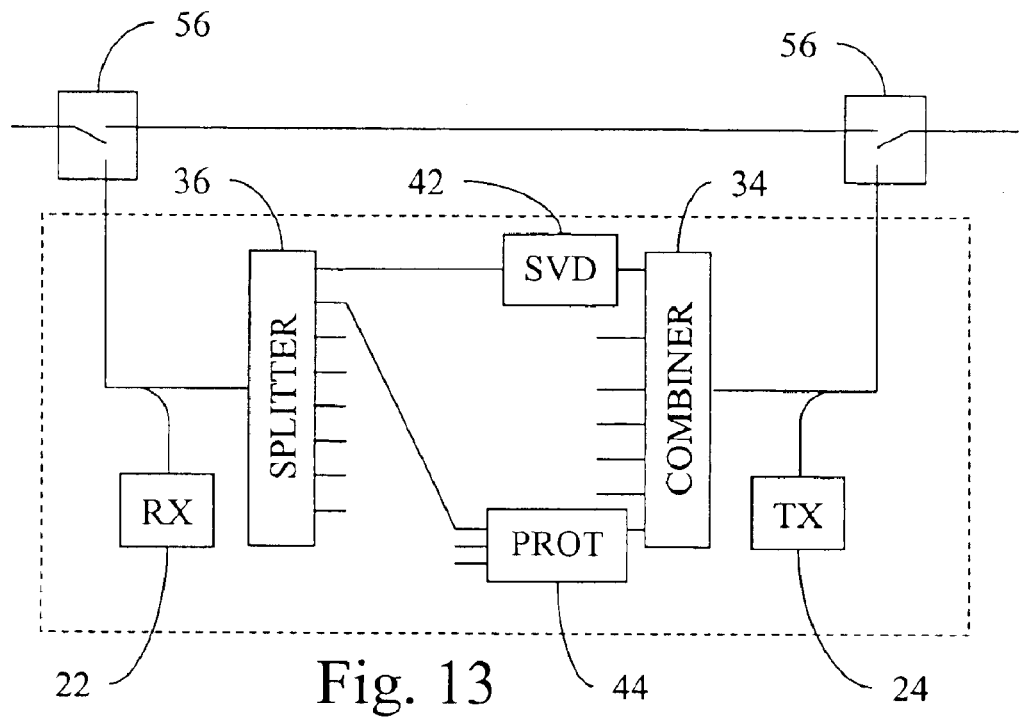

FIG. 13 illustrates another embodiment of an upgraded device (with the upgraded portion shown within the broken lines) in which active devices, such as switches 56, are used to re-route traffic through the upgraded portion of the device 40. The switches 56 may be, for example, mechanical switches or switches utilizing optical switch fabrics.

Switches 56 offer certain advantages for providing an upgrade path in a device 40. For example, as in the illustrated embodiment, it is sometimes desired to re-route the signal only through the upgraded portion of the device 40, and not to split the signal between the upgraded portion and the original portion. In such cases, switches typically introduce less attenuation than comparable splitters and combiners. However, switches 56 do not transition between states quickly enough to offer uninterrupted service in typical commercial communications systems and other high speed applications. In alternative embodiments, a splitter and signal blocker maybe used in place of switches 56.

Figure 14:
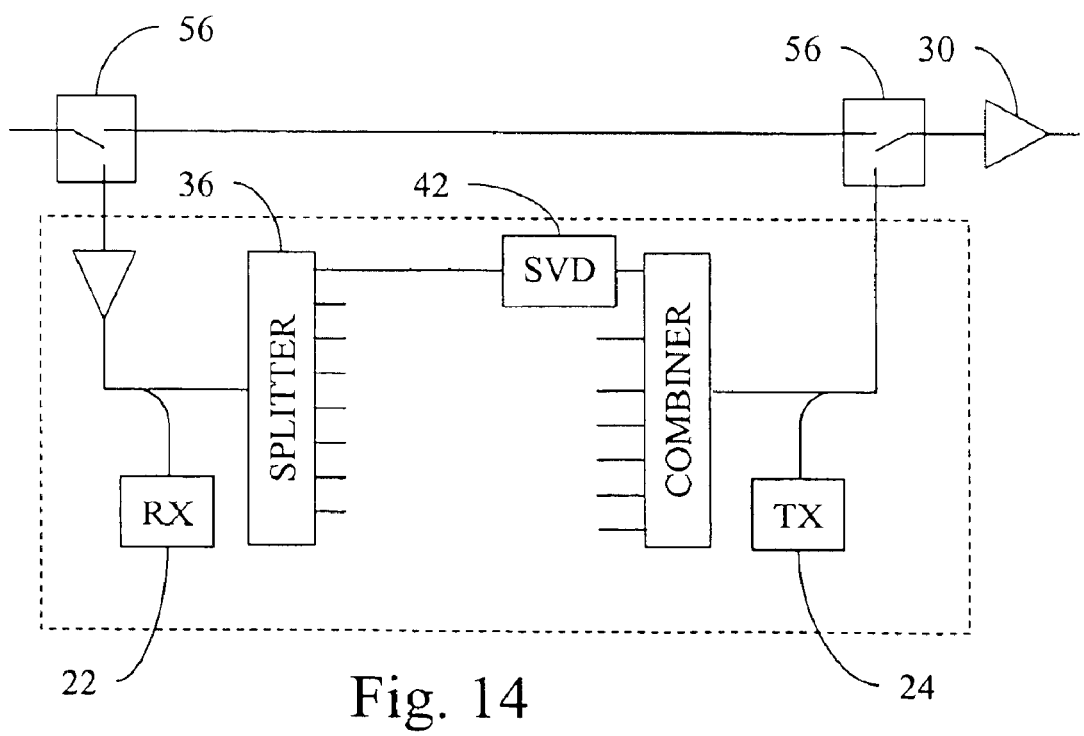

FIG. 14 illustrates another upgrade embodiment in which a line amplifier 30 is upgraded to include an add/drop multiplexer 26. The illustrated embodiment also utilizes an amplifier 58 in the upgraded portion of the device 40, although it is not required. Amplifiers 58 may be desirable in certain embodiments of the invention, particularly when signal attenuation occurs, such as with a split and filter architecture, with filters, or other signal processing.

Many upgrade variations are possible. For example, in each of the upgrade embodiments in FIGS. 10–14, loop back functionality is not illustrated, although it may be utilized with the present invention. Furthermore, transmitters 20 and receivers 22 for adding and dropping signals may or may not be provided at each port. In another example, one or more ports in a switch or other device which does not have add or drop functionality may be upgraded to add and/or drop traffic by connecting receivers 22 and transmitters 20 to unused outputs and inputs of the splitters 36 and combiners 34, or by providing dedicated splitter and combiner stages which can be used at a later time to connect transmitters 20 and receivers 22.

Figure 15:
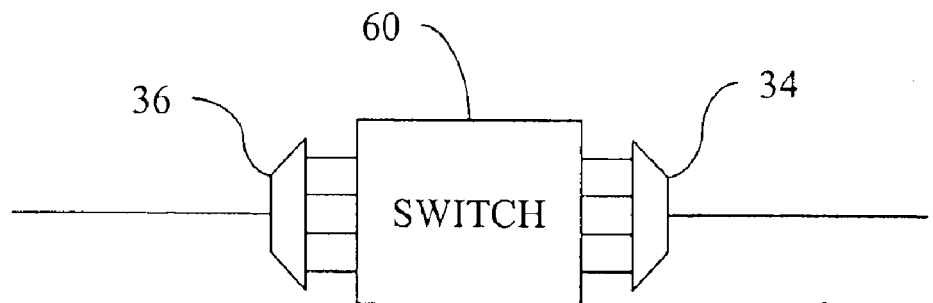
FIGS. 15–18 illustrate examples of signal varying devices.

FIG. 15 illustrates one embodiment of a signal varying device 42, including a demultiplexer 36, a switch 60, and multiplexer 34. A WDM signal is demultiplexed into individual channels or groups of channels, those channels or groups are each passed or blocked by the switch 60, and the passed channels are multiplexed together. The demultiplexer 36 is illustrated as demultiplexing the WDM signal into four channels or groups of channels, although the WDM signal may demultiplexed into more or less channels or groups, depending on the application. The number of demultiplexed channels or groups can vary depending, for example, on the number of channels in the WDM signal and the desired granularity in the signal varying device. For example, it may be desired to control each individual channel, or it may be desired to control groups of two or more channels in the WDM signal, thereby requiring less demultiplexing, switching, and multiplexing. The demultiplexer 36 may operate in one or more stages, such as by first separating the signals into broad groups, followed by further separation within each group. The demultiplexer 36 may operate by splitting and filtering the signals, by directly separating signals, such as with a bulk grating, or by other means.

The switch 60 can be one or more switch elements which selectively vary the signals, such as by either passing or blocking the signals, or partially or selectively passing or blocking the signals. For example, the switch 60 may utilize optical switch fabrics, such as MEMS elements, liquid crystal elements, variable index of refraction elements, variable optical attenuators, and controllable optical gain/loss elements. The switch 60 may be mechanical, such that an optical connection is made or broken to pass or block the signals, or to selectively make one of several connections imparting different properties of the signals. For example, one connection may cause attenuation, another may cause amplification, another may subject the signals to filtering, etc. In other embodiment, the switch 60 may be solid state.

Alternatively, the demultiplexer 36 and multiplexer 34 may be eliminated, and the switch 60 may have a single input and a single output, and the signal varying device may operate as an on-off switch that either passes all channels or blocks all channels. Many other variations and combinations are possible.

Figure 16:
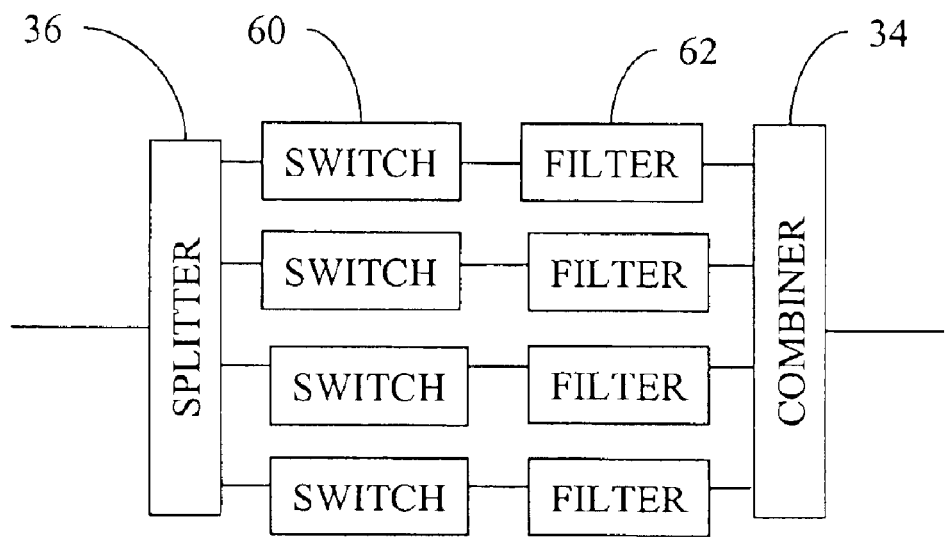

FIG. 16 illustrates another embodiment of the signal varying device 42 including splitters 36, switch 60 and filter 62 combinations, and combiners 34. In that embodiment, the WDM signal is split into several signals, those signals are provided to corresponding switch 60 and filter 62 combinations, and the resultant signals are combined.

Each switch 60 and filter 62 combination corresponds to a channel or group of channels in the WDM signal that are passed by the filter 62. If that particular channel or group is to continue through the signal varying device 42, the switch 60 passes the channel or group, and if it is not to pass through the signal varying device 42, the switch 60 blocks the channel or group. The passed channels or groups are combined and pass out of the signal varying device 42.

The filters 62 selectively pass and block optical channels or groups of channels and may be, for example, Bragg gratings. Each filter 62 may pass and block a unique combination of channels, such that the combination of filters 62 provides for control over the entire WDM signal. Alternatively, only a portion of the WDM signal may be of interest to the signal varying device 42, and the filters 62 may provide for control over less than all of the WDM signals. For example, one or more signal bypass paths may be provided with filters 62 but without switches 60, so that some of the signal channels (those that pass through the filters) are not blocked. In other embodiments, the filters 62 may overlap and/or there may be redundancy in the filters 62, such as to provide for protection in the event of the failure in one of the signal paths.

Figure 17:
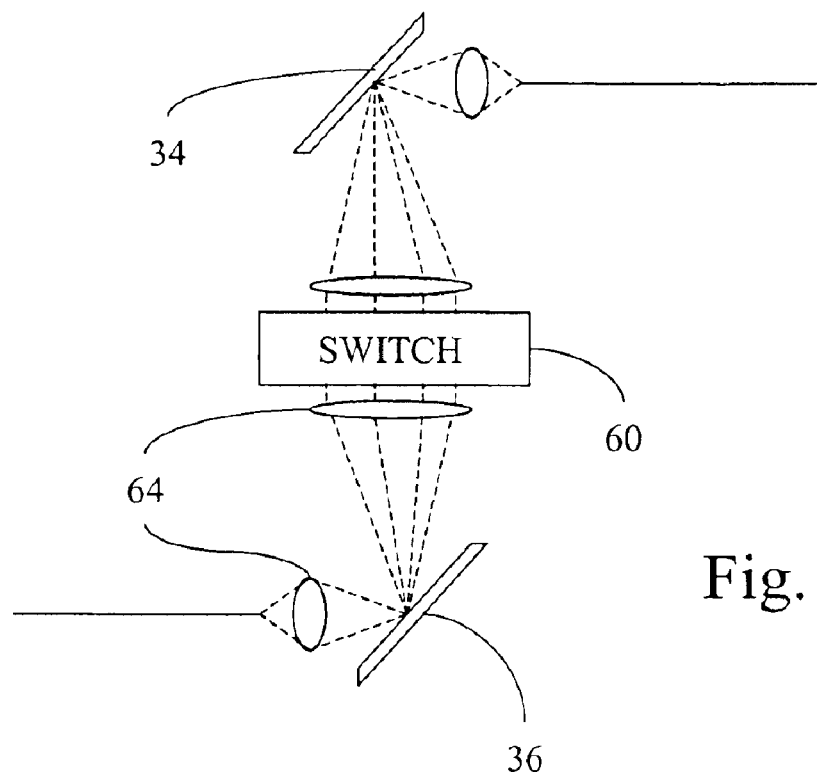

FIG. 17 illustrates another embodiment of the signal varying device 42 in which the demultiplexers 36 and multiplexers 34 are diffraction gratings. Lenses 64 may be used to focus the WDM signal onto the diffraction grating for demultiplexing and into the optical path after multiplexing. Lenses 64 may also be used with the switch 60 to focus and/or direct the signals.

Figure 18:
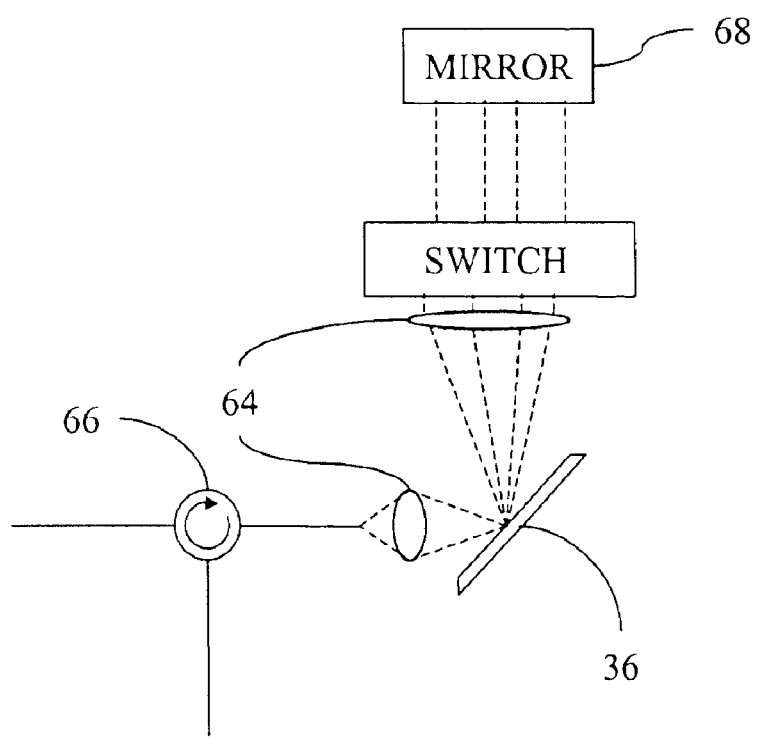

FIG. 18 illustrates another embodiment of the signal varying device 42 using a circulator 66 and mirror 68 and in which the optical signals utilize the same diffraction grating twice, once as a demultiplexer 36 and once as a multiplexer 34.

Figure 19:
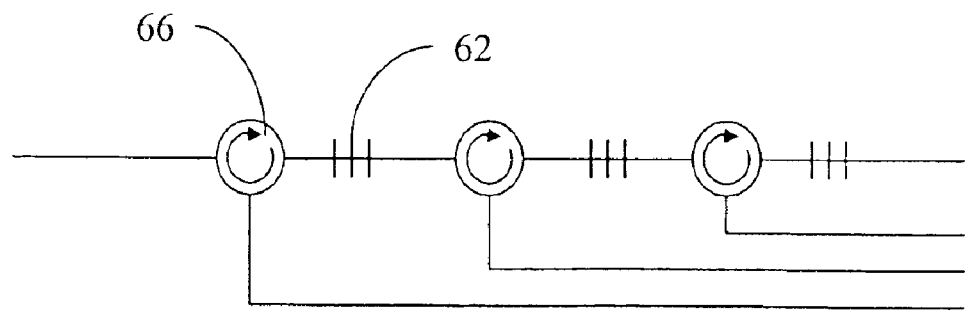
FIGS. 19–21 illustrate examples of demultiplexers.

FIG. 19 illustrates another embodiment of the demultiplexer 36 using circulators 66 and filters 62 to demultiplex the WDM signal. The circulators 66 allow a WDM signal to pass to the filter 62, where a portion of the signal passes through the filter 62 and a portion of the signal is reflected back towards the circulator 66, where it is passed to another optical path. In the illustrated embodiment, four channels or groups of channels are demultiplexed onto four separate optical paths, although more or less channels or groups may be demultiplexed. Although the demultiplexer has been described in terms of the selected signals being reflected by the filters 62, the demultiplexer may be modified so that the selected signals are passed by the filters 62. The multiplexer 34 can be constructed in a manner analogous to the demultiplexer 36.

Figure 20:
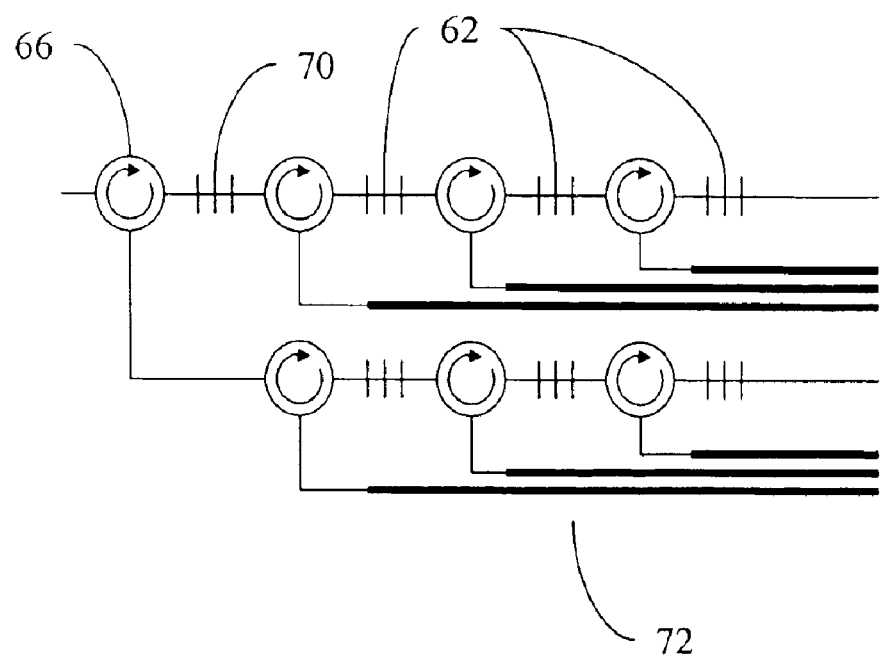

FIG. 20 illustrates another embodiment of the demultiplexer 36 including a multiple tier filtering scheme. In that embodiment, a group filter 70 passes a broader group of channels than is passed by the more selective filters 62. The group filter reflects the other channels, which may be further filtered, such as by another group filter 70. Group filters 70 may be particularly useful when the demultiplexer 36 includes a large number of filters, so as to reduce the difference between the shortest and longest path length of the various channels or groups. The group filters 70 may also be useful if the filters 62 used to demultiplex individual channels or smaller groups of channels do not have a sufficient reflective bandwidth. The demultiplexer 36 may also include various lengths of attenuation fiber 72 which compensates for variations in insertion loss for different paths through the demultiplexer.

Figure 21:
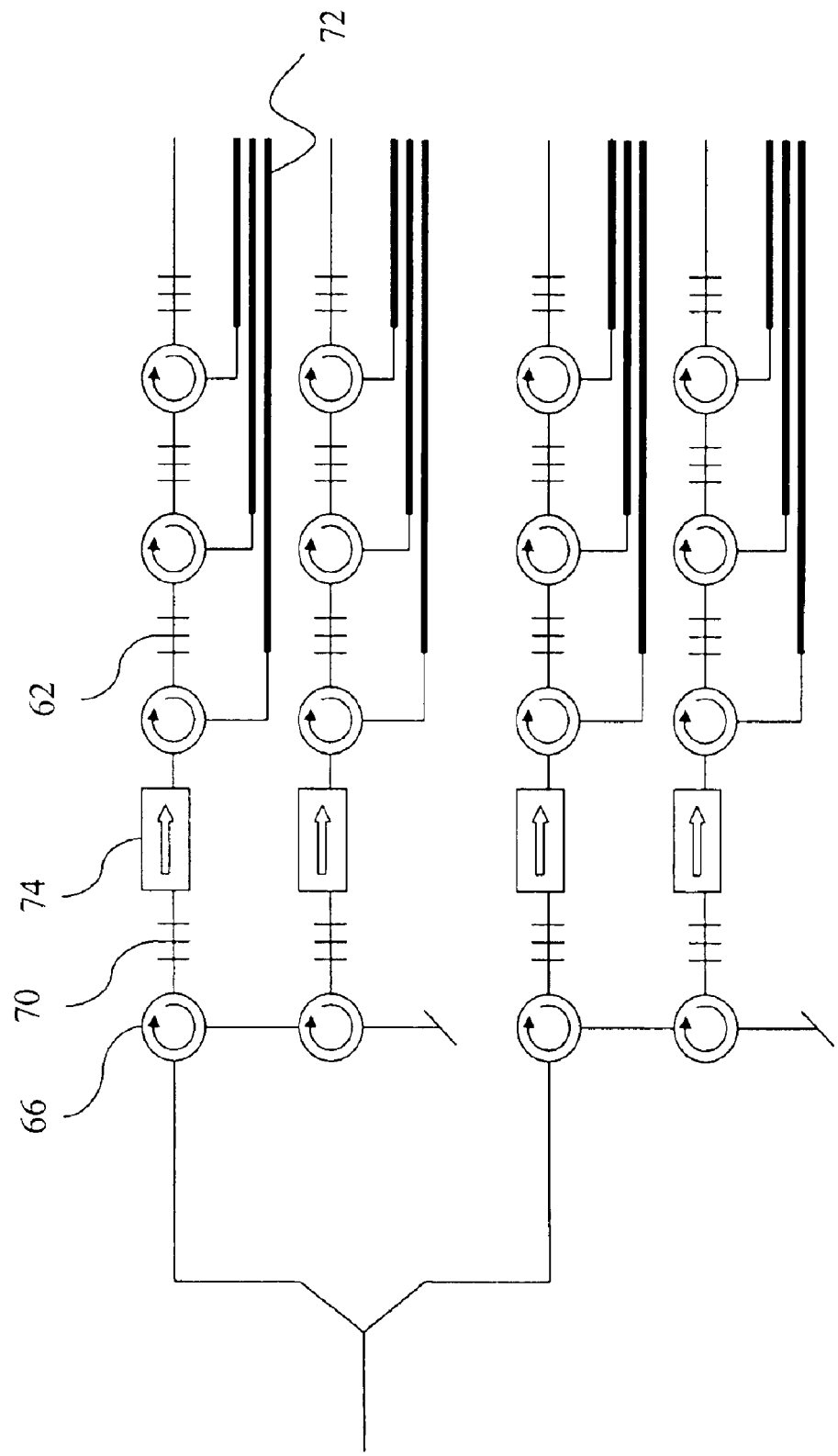

FIG. 21 illustrates another embodiment of the demultiplexer 36 in which the WDM signal is split and each portion of the split signal is demultiplexed with a combination of circulators 66 and filters 62, 70. The demultiplexer 36 may also include isolators 74 to prevent reflected signals from propagating backwards through the demultiplexer 36.

Figure 22:
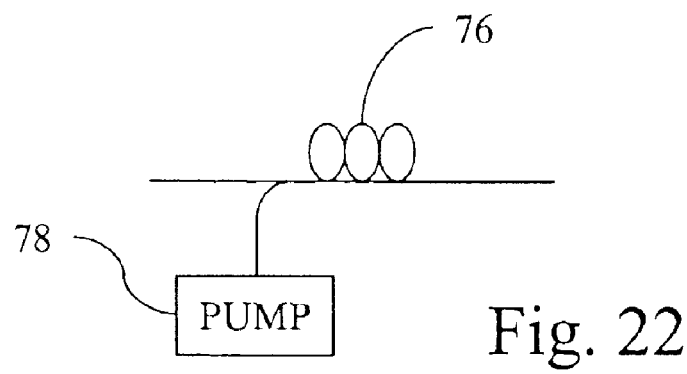
FIGS. 22 and 23 illustrate examples of signal varying devices.

FIG. 22 illustrates one embodiment of a switch 60 utilizing a switch fabric which controls the gain and loss of the optical signal passing therethrough. In that embodiment the switch 60 includes a doped optical path 76, such as optical fiber doped with Erbium or other dopants, and a pump 78. The switch 60 is controlled with the pump 78. If the doped optical path 76 is not pumped, it will block the optical signal entering the switch 60. If the doped optical path 76 is pumped, it will pass or even amplify the signal, depending on the extent to which the doped optical path 76 is pumped. The switch 60 can be modified, such as by changing the number and location of the pumps 78, by counterpumping or both co-pumping and counterpumping the doped optical path 76, or by changing the switch fabric, or by using other forms of attenuation and/or amplifications. For example, the signal varying device 42 may include an amplifier, such as a doped fiber amplifier, a Raman amplifier, or other types of amplifiers, separate from the switch fabric. For example, undoped optical paths 76, such as dispersion compensating optical fiber, may be used to attenuate and block the signal, and Raman pumping of the optical path 76 may be used to reduce the attenuation or amplify the signal when it is to pass through the switch 60.

Figure 23:
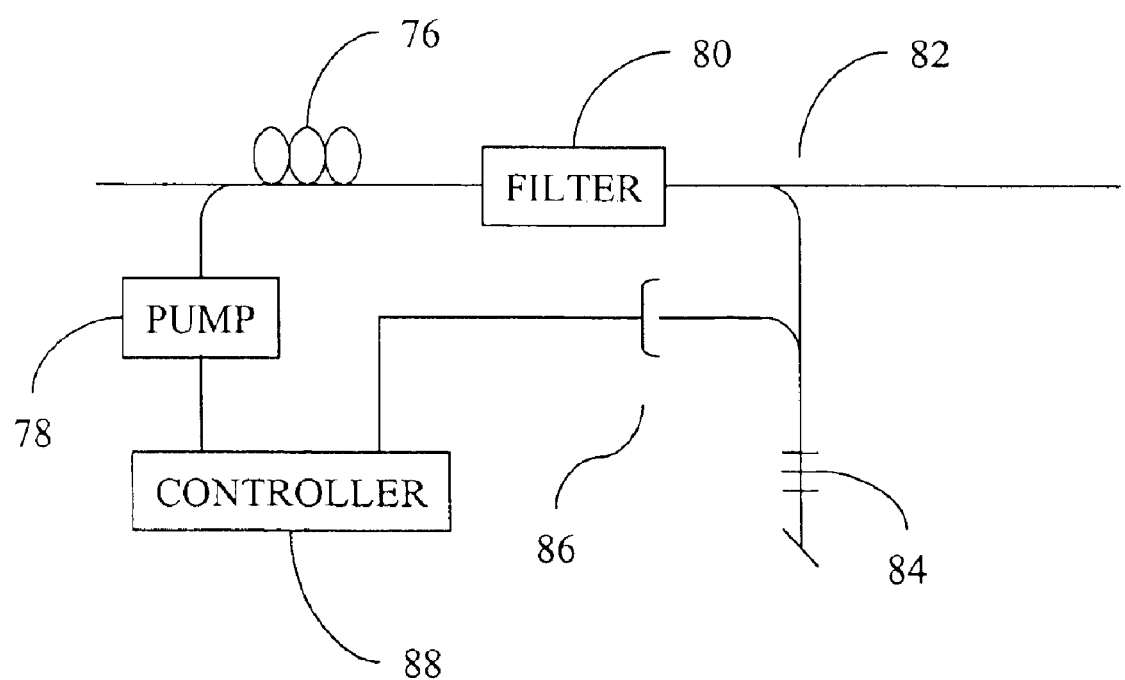

FIG. 23 illustrates another embodiment of the switch 60 including a filter 80, such as a gain flattening filter, noise filter, etc., for modifying the signal after it passes through the optical path 76. That embodiment also includes a signal tap 82 routing a portion of the signal to a detector, such as an filter 84 and photodiode 86 combination. The filter 84 may be, for example, an ASE filter which reflects a portion of the signal indicative of amplified spontaneous emissions and the photodetector 86 monitors that signal and provides feedback which can be used by a controller 88 to control the pump 78 to reduce, for example, ASE. The filter 84 can be modified to select attributes of the signal other than ASE.

Figure 24:
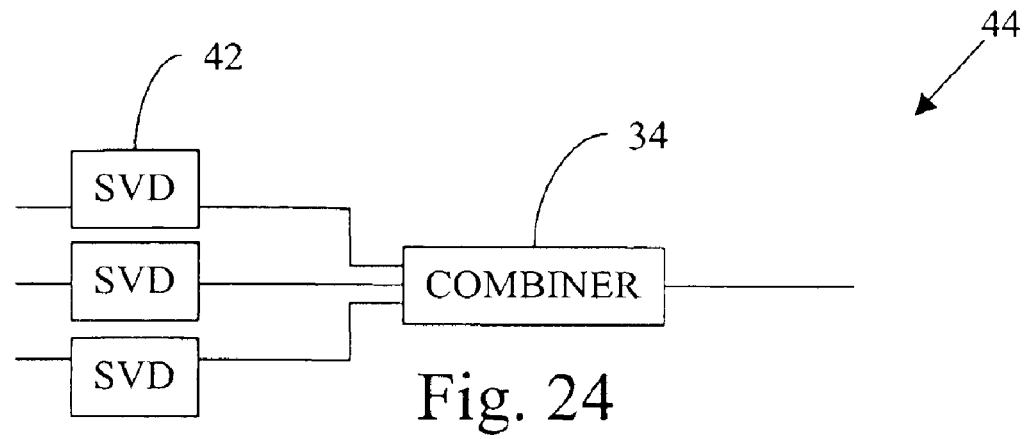
FIGS. 24–27 illustrate examples of protection devices.

FIG. 24 illustrates one embodiment of a protection device 44 including several signal varying devices 42 and a combiner 34. In that embodiment, a signal varying device 42 is connected to each input of the protection device 44, so that the incoming signals are selectively passed or blocked, and then output through the combiner 34. The signal varying devices 42 may also perform other functions on the signals, such as amplification, signal grooming, etc.

Figure 25:
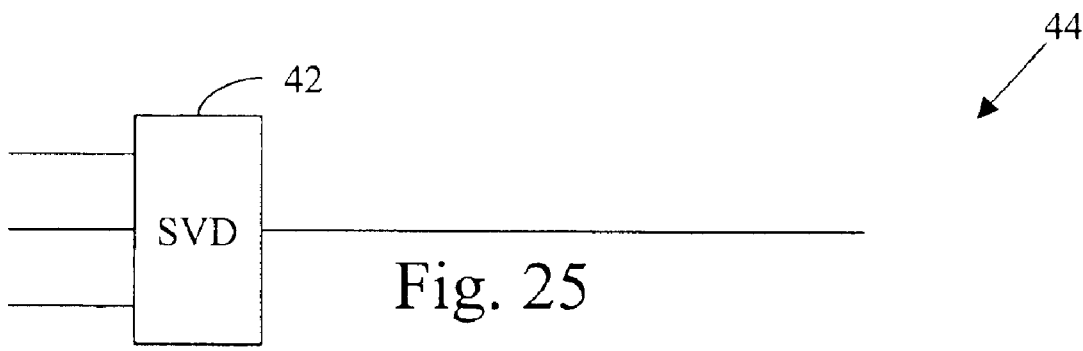

FIG. 25 illustrates another embodiment of the protection device 44 in which a single signal varying device 42 has more than one input and processes several signals. For example, the signal varying device 42 may be a 3:1 mechanical switch. In other embodiments, the signal varying device 42 may have more than one output, or multiple inputs and multiple outputs.

Figure 26:
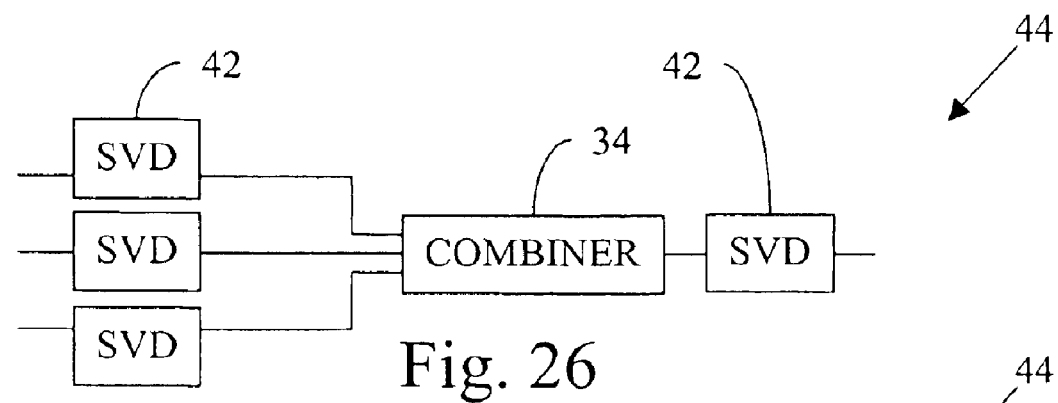

FIG. 26 illustrates another embodiment of the protection device 44. That embodiment is similar to the embodiment of FIG. 24, except that an additional signal varying device 42 is connected to the output of the combiner 34. In that embodiment, the signal varying devices 42 at the inputs may be relatively simple, inexpensive devices, such as on-off switches, and the additional signal varying device 42 after the combiner 34 may be one which can perform more sophisticated signal varying operations. This embodiment may be a more cost-effective alternative to the embodiment of FIG. 24 when sophisticated signal varying operations are required.

Figure 27:
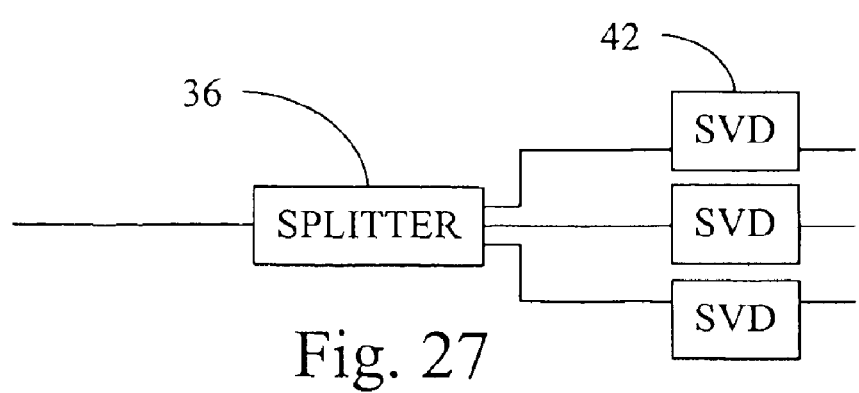
Figure 28:
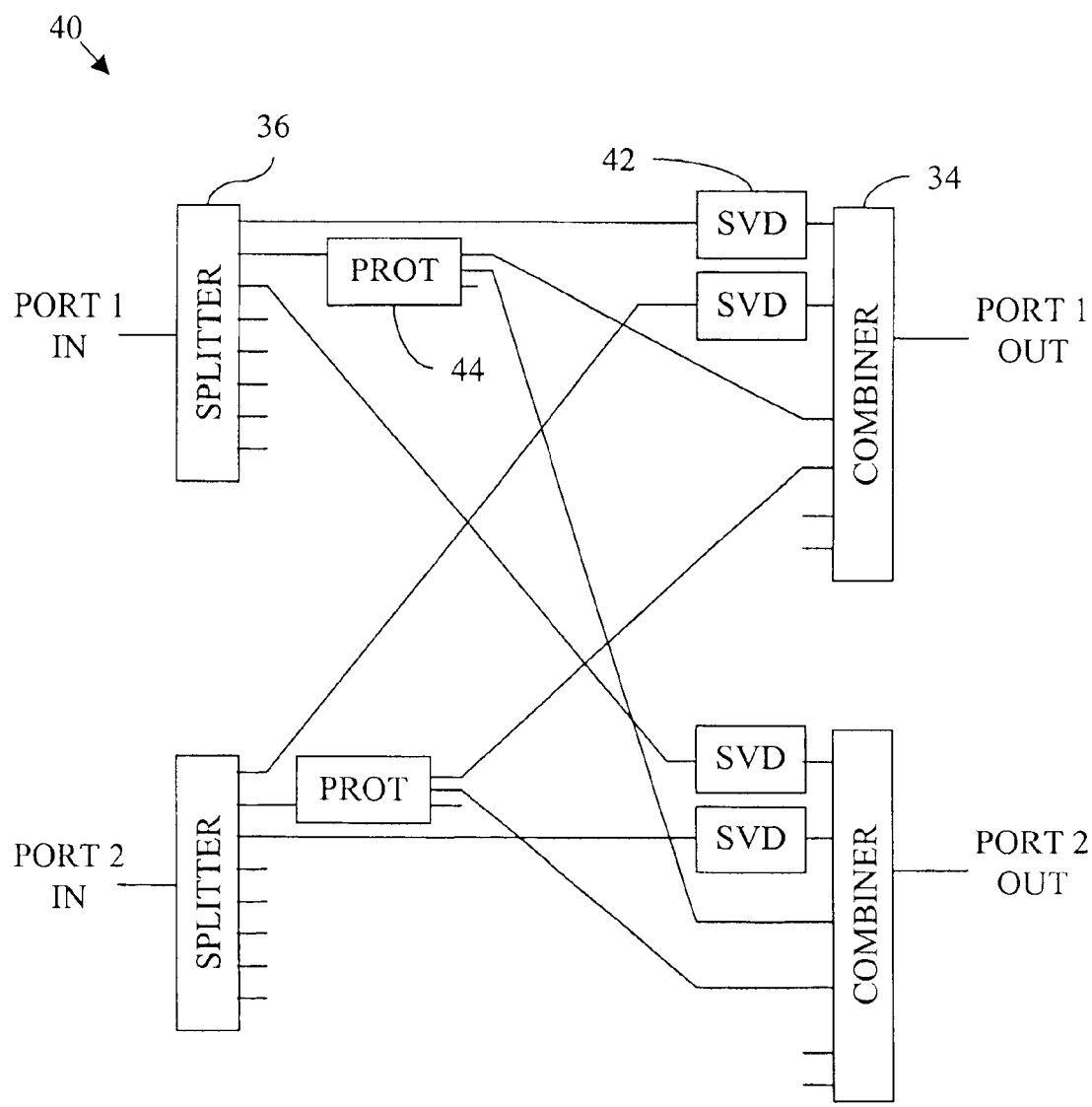
FIG. 28 illustrates an example of a device utilizing a protection device of FIG. 27.

FIG. 27 illustrates another embodiment of the protection device 44. That embodiment is analogous to the protection device 44 illustrated in FIG. 24, except that instead of have multiple inputs and one output, it has one input and multiple outputs. That protection device 44 may be used in an analogous manner to the other protection devices 44, except that instead of being part of the protection path from several input ports of the device 40 to one output port of the device 40, it is part of the protection path from one input port to several output ports. FIG. 28 illustrates an embodiment utilizing a protection device 44 such as that described with respect to FIG. 27.

Figure 29:
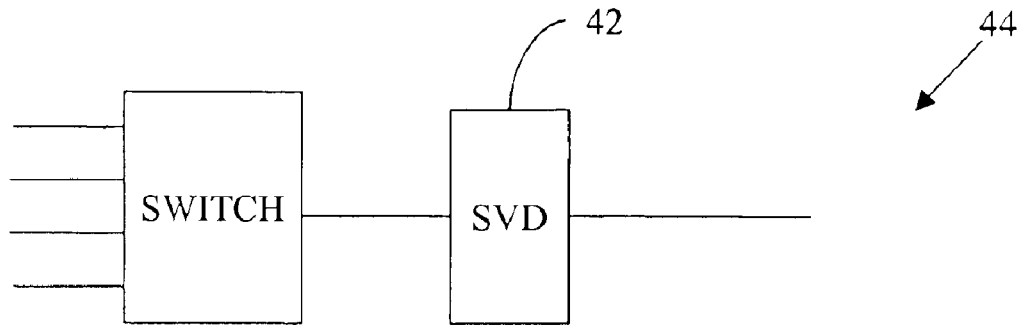
FIGS. 29–31 illustrate examples of protection devices.

FIG. 29 illustrates another embodiment of a protection device in which a switch, such as an optomechanical switch, connects one of the inputs to the signal varying device 42. Other types of switches may also be used.

Figure 30:
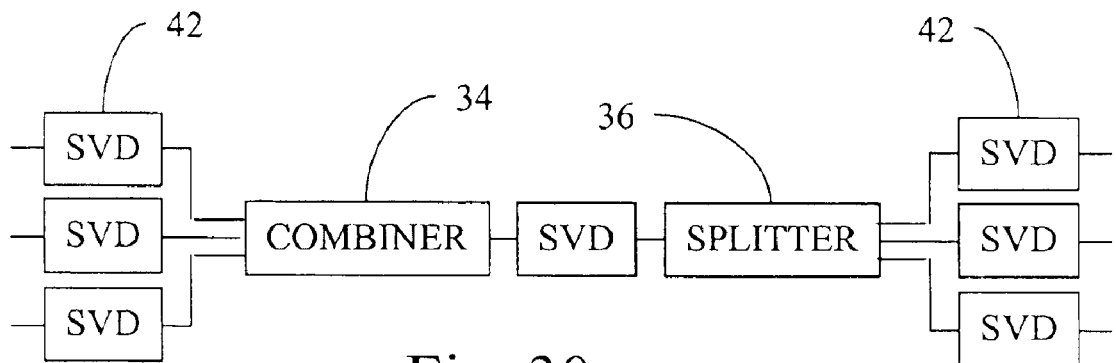

FIG. 30 illustrates another embodiment of a protection device in which may be used, for example, to provide a protection path from multiple device 40 input ports to multiple output ports. That embodiment provides more protection path flexibility. The illustrated embodiment includes a first set of signal varying devices 42 which may be used to selectively pass or block signals before they reach a combiner 34. This first set of signal varying devices 42 may be simple block/pass devices, or they may perform more sophisticated signal processing. The combiner 34 combines the signals and a signal varying device 42 between the combiner 34 and splitter 36 performs signal processing on the signals which are passed through the combiner 34. The splitter 36 splits the signals to another set of signal varying devices 42 which may be simple block/pass devices, or which may perform more sophisticated signal processing. Many variations of this protection device are possible, such as changing the number and location of signal varying devices, the number of inputs and outputs, etc. For example, the first set of signal varying devices 42 may be eliminated and signal filtering may be performed by other signal varying devices, such as if the signal varying device 42 between the combiner 34 and splitter 36 can perform wavelength specific, or spectral group specific, signal processing or filtering. In another embodiment, the signal varying device 42 between the combiner 34 and splitter 36 may be eliminated if, for example, signal processing is not needed or if it is performed by other signal varying devices 42. Other variations are also possible.

Figure 31:
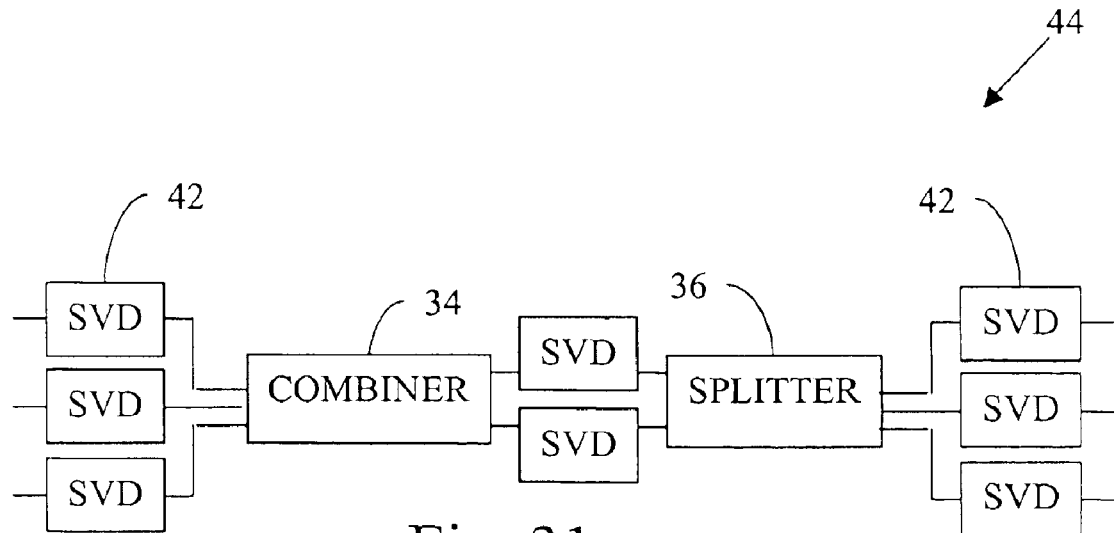

FIG. 31 illustrates another embodiment of a protection device which is similar to that illustrated in FIG. 30, except that there is more than one path between the combiner 34 and splitter 36, with more than one signal varying device, thereby allowing for more flexibility. For example, when compared to the device illustrated in FIG. 30, different signal channels may be processed differently using less sophisticated signal varying devices 42 between the combiner 34 and splitter 36. Other variations are also possible, such as by changing the number of signal varying devices between the combiner 34 and splitter 36.

Figure 32:
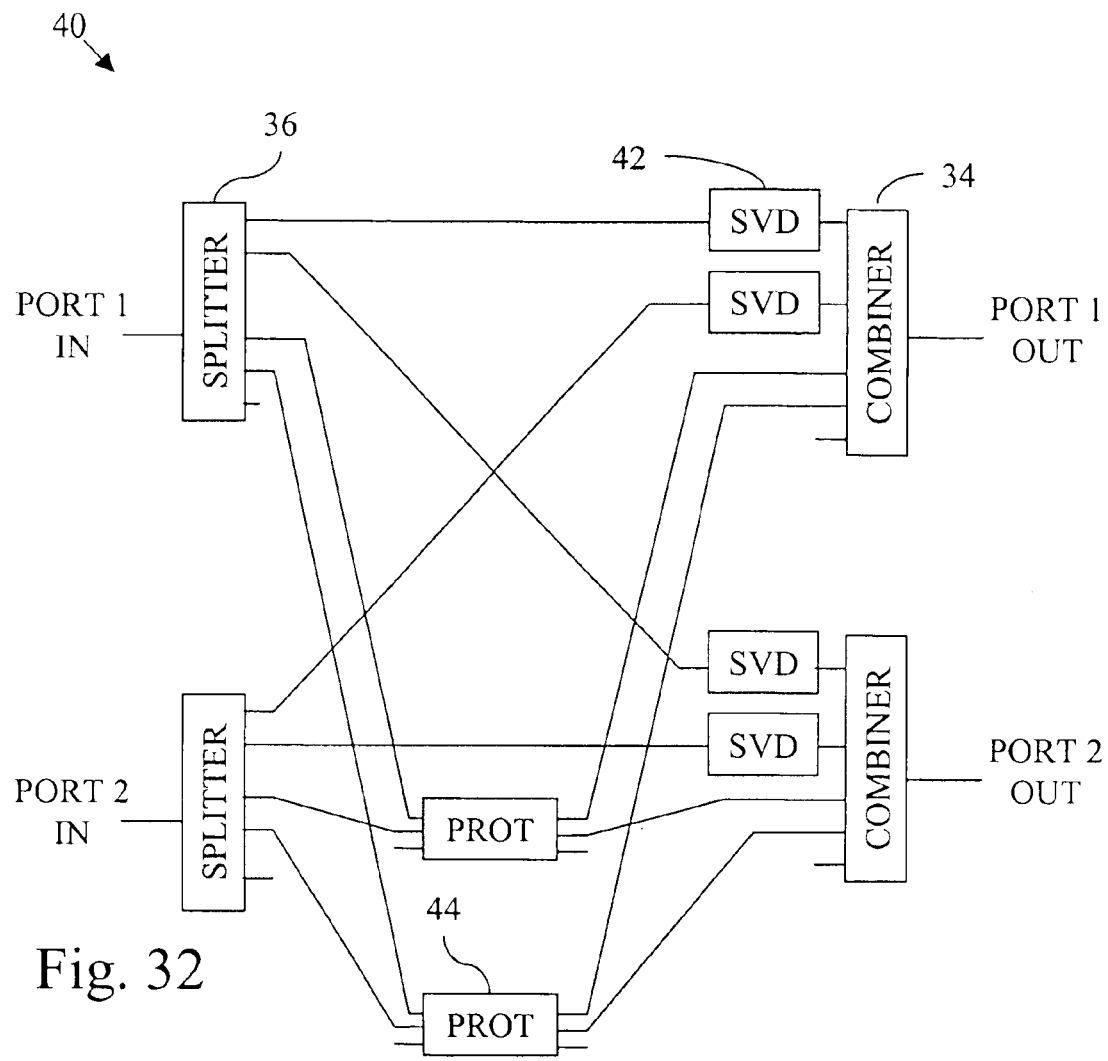
FIG. 32 illustrates an example of a device having a protection device connected to more than one input port and more than one output port.
Figure 33:
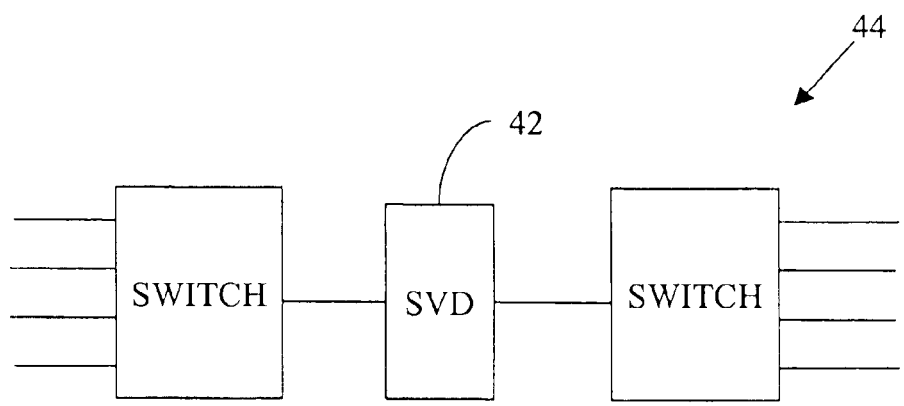
FIG. 33 illustrates another example of a protection device.

FIG. 32 illustrates another embodiment of a device 40 in which a protection device 44 protects more than one input port and more than one output port. In that embodiment, a protection device 44 receives inputs from two input ports and can provide output to two output ports. The protection scheme in the illustrated embodiment uses less outputs and inputs from the splitters 36 and combiners 34, respectively, which can reduce loss and improve performance. The illustrated embodiment has two ports and two protection devices 44, although more ports and more or less protection devices 44 may be used. FIG. 33 illustrates a protection device 44 which may be used, for example, in the device 40 illustrated in FIG. 32.

Many variations and modifications can be made to described embodiments of the invention without departing from the scope of the invention. For example, advantages of the present invention can be realized with different numbers, configurations, and combinations of the number of ports into and out of devices 40, the number of connections to and from the splitters 36, combiners 34, signal varying devices 42, and protection devices 44, by varying the connectivity within the device 40, varying the protection scheme, varying the arrangement of within the device 40, varying functionality of the device 40, etc. Furthermore, the present invention has been generally described in terms of all-optical device 40, although benefits of the present invention may be realized utilizing device 40 that are not all-optical, such as one with O-E-O conversions in multiplexers 34, demultiplexers 36, signal varying devices 42, or protection devices 44, as well as in other places, while still realizing benefits of the present invention. Other variations, modifications, and combinations are taught and suggested by the present invention, and it is intended that the foregoing specification and the following claims cover such variations, modifications, and combinations.

What is claimed is:

1. An all-optical device for use in a communications system, comprising:
    a plurality of ports, each having an input and an output;
    a plurality of splitters corresponding to the port inputs;
    a plurality of combiners corresponding to the port outputs;
    a plurality of signal paths between the splitters and the combiners, wherein each of the signal paths includes a signal varying device; and
    a plurality of protection devices connected between the splitters and the combiners, wherein each of the plurality of protection devices includes a signal varying device and provides a protection path corresponding to a plurality of the signal paths, and wherein at least one splitter has at least one unused output after the signal paths and the protection paths are connected, and wherein at least one combiner has at least one unused input after the signal paths and the protection paths are connected.

2. The device of claim 1, wherein the protection device includes at least one unused connection after the signal paths and the protection paths are connected.

3. The device of claim 1, wherein the device includes at least three ports.

4. The device of claim 3, wherein the signal paths from each of the splitters are connected to less than all of the combiners.

5. The device of claim 3, wherein the signal paths from each of the splitters are connected to each of the combiners.

6. The device of claim 1, wherein each of the splitters is connected to a plurality of protection devices.

7. The device of claim 6, wherein each of the plurality of protection devices connected to each of the splitters forms part of a protection path for at least one corresponding signal path, and wherein each of the signal paths has a corresponding protection path connected to only one protection device at each port output.

8. The device of claim 1, wherein the splitters include multiple splitter stages.

9. The device of claim 1, wherein the combiners include multiple combiner stages.

10. The device of claim 5, wherein the device includes loop back functionality.

11. The device of claim 3, wherein each of the protection devices includes a plurality of inputs connected to a plurality of the splitters, and an output connected to a corresponding one of the combiners.

12. The device of claim 11, wherein the inputs of the protection devices are connected to less than all of the splitters.

13. The device of claim 11, wherein the inputs of each of the protection devices are connected to each of the splitters.

14. The device of claim 3, wherein each of the protection devices includes an input connected to a corresponding one of the splitters, and includes a plurality of outputs connected to the combiners.

15. The device of claim 1, wherein a signal path to a port output has a plurality of corresponding protection paths to a same port output.

16. The device of claim 15, wherein each of the plurality of corresponding protection paths includes a separate protection device.

17. The device of claim 1, wherein the splitters include a first stage splitter having an input and a plurality of outputs, and a second stage splitter having an input connected to one of the outputs of the first stage splitters, and having a plurality of outputs.

18. The device of claim 17, wherein the combiners include a first stage combiner having a plurality of inputs and an output, and a second stage combiner having a plurality of inputs, one of which being connected to the output of the first stage combiner, and having an output.

19. An all-optical device for use in a communications system, comprising:

a plurality of ports, each having an input and an output;

a plurality of splitters corresponding to the port inputs, wherein the splitters include a first stage and a second stage;

a plurality of combiners corresponding to the port outputs, wherein the combiners include a first stage and a second stage;

a plurality of signal paths between the splitters and the combiners, wherein each of the signal paths includes a signal varying device;

a plurality of protection devices connected between the splitters and the combiners, wherein each of the plurality of protection devices provides a protection path for a plurality of the signal paths;

a plurality of optical receivers connected to outputs of the first stage splitters; and a plurality of optical transmitters connected to inputs of the second stage combiners.

20. The device of claim 19, wherein the optical receivers receive split optical signals and produce electrical signals corresponding to optical signals which are dropped at the device.

21. The device of claim 19, wherein the optical transmitters receive electrical signals and produce corresponding optical signals which are added at the device.

22. The device of claim 19, wherein the signal varying devices selectively block optical signals to allow for wavelength reuse.

* * * * *